United States Patent [19]
McDaniel et al.

[11] Patent Number: 5,903,525
[45] Date of Patent: May 11, 1999

[54] COIL FOR USE WITH MAGNETO-OPTICAL HEAD

[75] Inventors: Terry McDaniel, Morgan Hill; Yugang Wang, Milpitas, both of Calif.

[73] Assignees: Read-Rite Corporation, Milpitas; Quinta Corporation, San Jose, both of Calif.

[21] Appl. No.: 08/844,167

[22] Filed: Apr. 18, 1997

[51] Int. Cl.[6] .................................................. G11B 11/00
[52] U.S. Cl. .............................................. 369/13; 360/114
[58] Field of Search ................................ 369/13, 14, 112, 369/118, 44.14, 110; 360/114, 59, 102, 103

[56] References Cited

U.S. PATENT DOCUMENTS

| | | | |
|---|---|---|---|
| 4,890,178 | 12/1989 | Ichihara | 360/114 |
| 5,022,018 | 6/1991 | Vogelgesang | 369/13 |
| 5,071,509 | 12/1991 | Kano et al. . | |
| 5,072,324 | 12/1991 | Lin et al. . | |
| 5,105,408 | 4/1992 | Lee et al. | 369/44.15 |
| 5,124,961 | 6/1992 | Yamaguchi et al. | 369/13 |
| 5,197,050 | 3/1993 | Murakami et al. | 369/13 |
| 5,199,090 | 3/1993 | Bell | 385/33 |
| 5,227,012 | 7/1993 | Brandli et al. . | |
| 5,293,360 | 3/1994 | Hasegawa et al. . | |
| 5,295,122 | 3/1994 | Murakami et al. | 369/13 |
| 5,307,328 | 4/1994 | Jacobs et al. | 369/13 |
| 5,331,496 | 7/1994 | Wu et al. . | |
| 5,370,766 | 12/1994 | Desaigoudar et al. . | |
| 5,402,293 | 3/1995 | Smith | 360/114 |
| 5,448,538 | 9/1995 | Aratani et al. | 369/13 |
| 5,544,131 | 8/1996 | Albertini et al. | 369/13 |
| 5,563,871 | 10/1996 | Bargerhuff et al. | 369/119 |
| 5,572,179 | 11/1996 | Ito et al. . | |
| 5,615,183 | 3/1997 | Ishii | 369/13 |
| 5,617,378 | 4/1997 | Watanabe et al. | 369/13 |
| 5,617,379 | 4/1997 | Shinozaki et al. | 369/13 |
| 5,642,336 | 6/1997 | Albertini et al. | 369/13 |
| 5,689,478 | 11/1997 | Ishii et al. | 369/13 |
| 5,689,480 | 11/1997 | Kino | 369/13 |
| 5,703,839 | 12/1997 | Ishii | 369/570 |
| 5,703,840 | 12/1997 | Kazama | 369/13 |

FOREIGN PATENT DOCUMENTS

| | | |
|---|---|---|
| 59-117180 | 6/1984 | Japan . |
| 3-113756 | 5/1991 | Japan . |
| 3-260936 | 11/1991 | Japan . |
| 4 259943 | 1/1993 | Japan . |
| 6-325-426 | 11/1994 | Japan . |

*Primary Examiner*—Tan Dinh
*Attorney, Agent, or Firm*—Mark Wardas; Robert King; Samuel Kassatly

[57] ABSTRACT

A planar micro-coil is provided for use with an optical head. The optical head is preferably a flying magneto-optical head. The micro-coil cooperates with a yoke assembly so to as to permit an optimal magnetic flux density to be formed at a surface of a magneto-optical storage location.

30 Claims, 16 Drawing Sheets

COIL FOR USE WITH MAGNETO-OPTICAL HEAD

CROSS-REFERENCE TO RELATED PATENT APPLICATIONS

This application is being filed concurrently with and is related to: U.S. patent application Ser. No. 08/844,003; filed on Apr. 18, 1997; and entitled, "Magnetic Coil Assembly," and is incorporated herein by reference.

BACKGROUND OF THE INVENTION

1. Field of the Invention

The present invention relates generally to magnetic coils and more particularly to magnetic coils used with optical and magneto-optical heads.

2. Background Art

Hard disk technology has historically been limited by conventional magnetic head designs. A typical prior art Winchester magnetic storage system includes a magnetic head that has a slider element and a magnetic read/write element and is coupled to a rotary actuator magnet and coil assembly by a suspension and actuator arm so as to be positioned over a surface of a spinning magnetic disk. In operation, lift forces are generated by aerodynamic interactions between the magnetic head and the spinning magnetic disk. The lift forces are opposed by equal and opposite spring forces applied by the suspension such that a predetermined flying height is maintained over a full radial stroke of the rotary actuator assembly above the surface of the spinning magnetic disk.

Flying head designs have been proposed for use with magneto-optical (MO) storage technology. One motivation for using magneto-optical technology stems from the higher areal density capabilities of magneto-optical storage disks. However, despite the historically higher areal storage density available with MO storage technology, the prior art MO disk drive volumetric storage capacity has generally not kept pace with the volumetric storage capacity of magnetic disk drives.

One factor that continues to limit MO disk drives is the physical size of the head necessary to hold the various components required for accessing magneto-optical information. Magneto-optical information access requires the use of polarized laser light for reading and writing information on a MO disk. In the case of reading information, MO technology makes use of a magneto-optical effect ("Kerr" effect) to detect a modulation of polarization rotation imposed on a linearly polarized incident laser beam by a recorded surface. The polarization rotation (representing the information stored at recorded marks on the recorded surface or in the edges of the recorded marks) is embodied in a reflection of the linearly polarized laser beam and is converted by optics and electronics for readout.

During conventional writing of information in MO disk drives, an incident laser beam heats a selected spot of interest on the MO disk to approximately the Curie point. A time varying vertical bias magnetic field is used to define a pattern of "up" or "down" magnetic domains in a recording layer. Subsequently, as the selected spot of interest cools, information is recorded on the MO disk. The size of the magnetic field that is generated provides a limit on a maximum data density that may be recorded on the MO disk. One prior art approach for generating the necessary magnetic field for writing of information has relied on second surface recording techniques. With the second surface recording method, the magnetic field is applied to the spot of interest on the MO disk from a direction opposite that of the incident laser beam. With this approach, only one side of a MO disk may be used.

Other conventional magneto-optical heads, while presently providing access to magneto-optical disks with areal densities on the order of 1 Gigabit/$in^2$, have been based on relatively large optical assemblies, which make the physical size and mass of the head rather bulky (typically 3–15 mm in a dimension).

A number of flying MO head designs incorporating magnetic and optical elements are described in U.S. Pat. No. 5,295,122 by Murakami, including: use of free-space alignment of a laser beam with a dynamically moving target, and a number of different configurations of the magnetic and optical elements that are required for reading and writing using the magneto-optical Kerr effect. The large size, mass, and number of elements limits the minimum head size and, therefore: the speed at which information from the MO disk may be accessed, the tracking bandwidth, and the data density that may be read or written. In the prior art, the large physical size of MO flying heads also limits the spacing between magneto-optical disks to a finite minimum value. Consequently, because the volume available in standard height disk drives is limited, magneto-optical disk drives for use with magneto-optical flying heads have generally not been available as high capacity multi-platter commercial products.

What is needed, therefore, is an apparatus and method that improves upon prior art data densities that may be recorded on a storage media, data density access, data recording rates, and the number of storage media that may be operated within a given volume.

SUMMARY OF THE INVENTION

The present invention is directed towards use of a coil assembly in the transmission of light along an optical path located between a source and an storage media. The coil assembly of the present invention is used in conjunction with an optical head, which in one embodiment is a flying magneto-optical head. The coil assembly of the present invention improves upon: data densities that may be recorded on the storage media, data density access, data recording rates, and the number of storage media that may be operated within a given volume.

In one embodiment the coil assembly includes a planar magnetic micro-coil and a yoke. The coil assembly preferably couples to the optical head at locations that may include: a lower surface of an objective optics, or along a lower surface of the optical head; and along or within a periphery of the optical head. The optical head includes: a reflective substrate, an objective optic element, an optical fiber, and/or a quarter-wave plate. In one embodiment, the reflective substrate may include steerable micro-machined optics positioned in the optical path so as to direct the light through the coil assembly to an optical storage media. The coil assembly is preferably centered within an outer diameter of the objective optics. The coil assembly preferably includes a two layer coiled conductor housed partly within the yoke and encapsulated within an insulation layer. The coiled conductor may comprise one or multi-layers. In one embodiment, the magnetic coil may include a dielectric protective layer. In yet another embodiment the coil assembly may include only the coiled conductor. The magnetic coil and yoke are suitably dimensioned along a major axis to allow for an unobstructed optical path for steering of the light by the steerable mirror. In one embodiment, the magnetic coil and yoke may include an elongated geometry. In another embodiment, the magnetic coil may include a circular geometry. The yoke preferably includes a yoke tip that is suitably dimensioned to extend through an inner circumference of the magnetic coil assembly so as to permit an optimal magnetic flux density to be formed at a surface of the storage media. In one embodiment the storage media is an optical storage media. In another embodiment the storage media is a magneto-optical storage media.

DETAILED DESCRIPTION OF THE PREFERRED EMBODIMENTS

Figure 1:
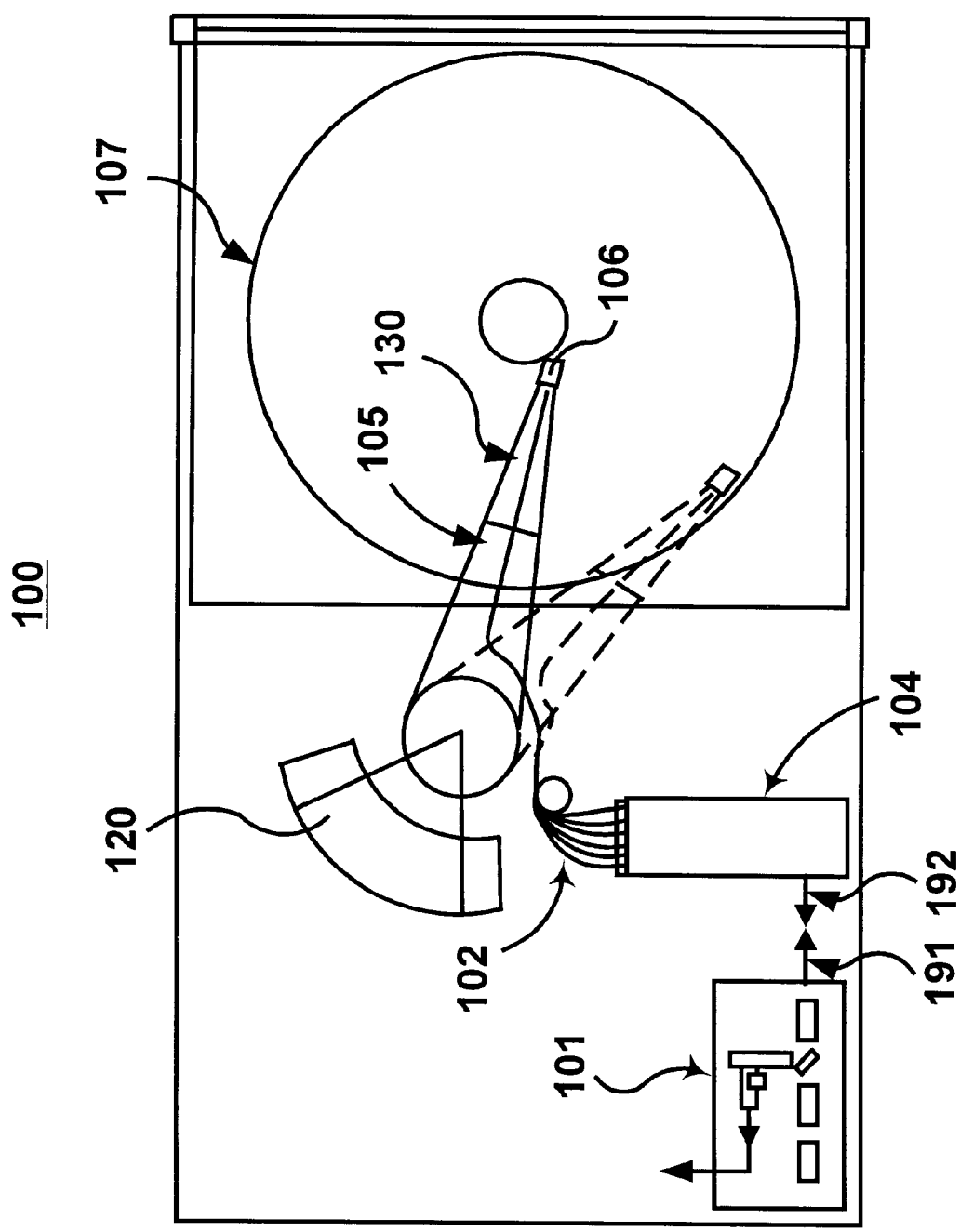
FIG. 1 is a diagram showing a magneto-optical data storage and retrieval system.

Referring in detail now to the drawings wherein similar parts of the invention are identified by like reference numerals, there is seen in FIG. 1 a diagram showing a magneto-optical data storage and retrieval system. In a preferred embodiment, a magneto-optical (MO) data storage and retrieval system 100 includes a set of Winchester-type flying heads 106 that are adapted for use with a set of double-sided MO disks 107 (one flying head for each MO disk surface). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor 195 so as to generate aerodynamic lift forces between the set of flying MO heads 106 and so as to maintain the set of flying MO heads 106 in a flying condition approximately 15 micro-inches above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107.

System 100 further includes: a laser-optics assembly 101, an optical switch 104, and a set of single-mode PM (polarization maintaining) optical fibers 102. In the exemplary embodiment, each of the set of single-mode PM optical fibers 102 are coupled through a respective one of the set of actuator arms 105 and suspensions 130 to a respective one of the set of flying MO heads 106. As will be discussed shortly, the set of flying MO heads 106 are used in a configuration that, compared to the prior art, enables improved access to the high areal storage density capability of magneto-optical storage media, reduces the weight and size of the head, improves disk access time, requires fewer optical components, and increases the number of storage disks that may be operated within a given volume.

Figure 2:
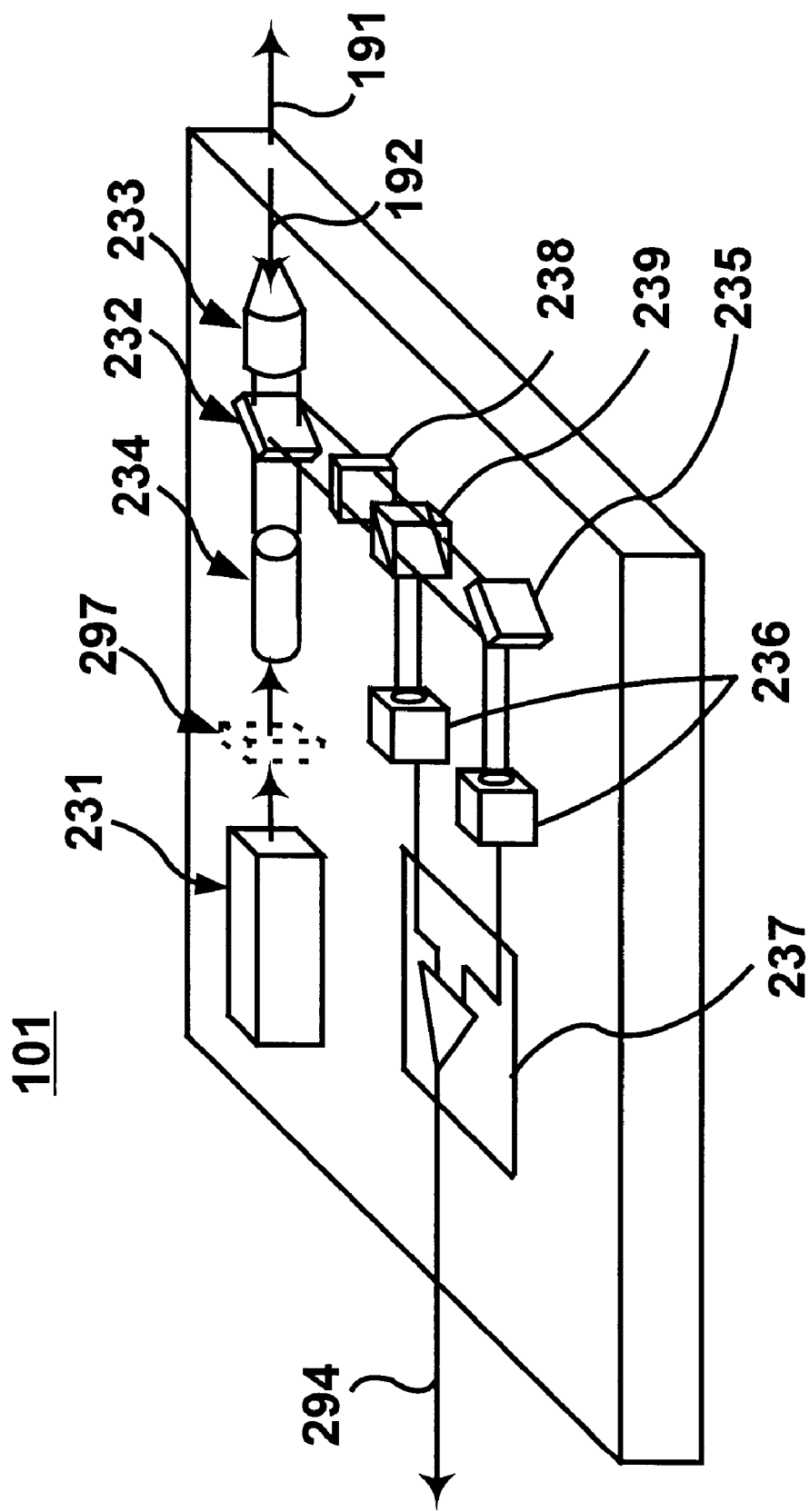
FIG. 2 is a diagram showing the laser-optics assembly of the magneto-optical data storage and retrieval system of FIG. 1.

FIG. 2 is a diagram showing the laser-optics assembly of the magneto-optical data storage and retrieval system of FIG. 1. In FIG. 2, the laser-optics assembly 101 is shown to include a linearly polarized diode laser source 231 operating in a visible or near ultraviolet frequency region and emitting an optical power sufficient for reading and writing using the set of MO disks 107. In one embodiment, the linearly polarized laser source 231 may be a distributed feed-back (DFB) laser source. In an exemplary embodiment, the linearly polarized laser source 231 is selected to operate within a range 635–685 nm; however, a laser source of other frequencies could also be used. The laser-optics assembly 101 further includes: an optical isolator 297, a collimating optics 234, a low wavelength dispersion leaky beam splitter 232, and a coupling lens 233. The laser-optics assembly 101 directs (from the linearly polarized laser source 231) a linearly polarized outgoing laser beam 191 (shown in FIG. 1) to the optical switch 104. Laser-optics assembly 101 further includes: a ¼ wave plate 238, a mirror 235, and a polarizing beam splitter 232. In the first embodiment of the laser source 231, a linearly polarized reflected laser beam 192 (shown in FIG. 1) is directed by the optical switch 104 to the coupling lens 233, and is routed by the leaky beam splitter 232 to a differential detector comprising: the ¼ wave plate 238, the mirror 235, and the polarizing beam splitter 239. As is well established in the art, this type of differential detection scheme measures the optical power in two orthogonal polarization components of the reflected laser beam 192, with a differential signal being a sensitive measure of polarization rotation induced by the Kerr effect at the surface of one of the set of MO disks 107. In both embodiments, after conversion by a set of photodiodes 236, the differential signal is processed by the differential amplifier 237 for output as signal 294. The present invention is not meant to be limited to the aforementioned arrangement of optical elements and sources of light, as other techniques for directing the outgoing laser beam 191 and for detecting the reflected laser beam 192 are well known in the art.

Figure 3:
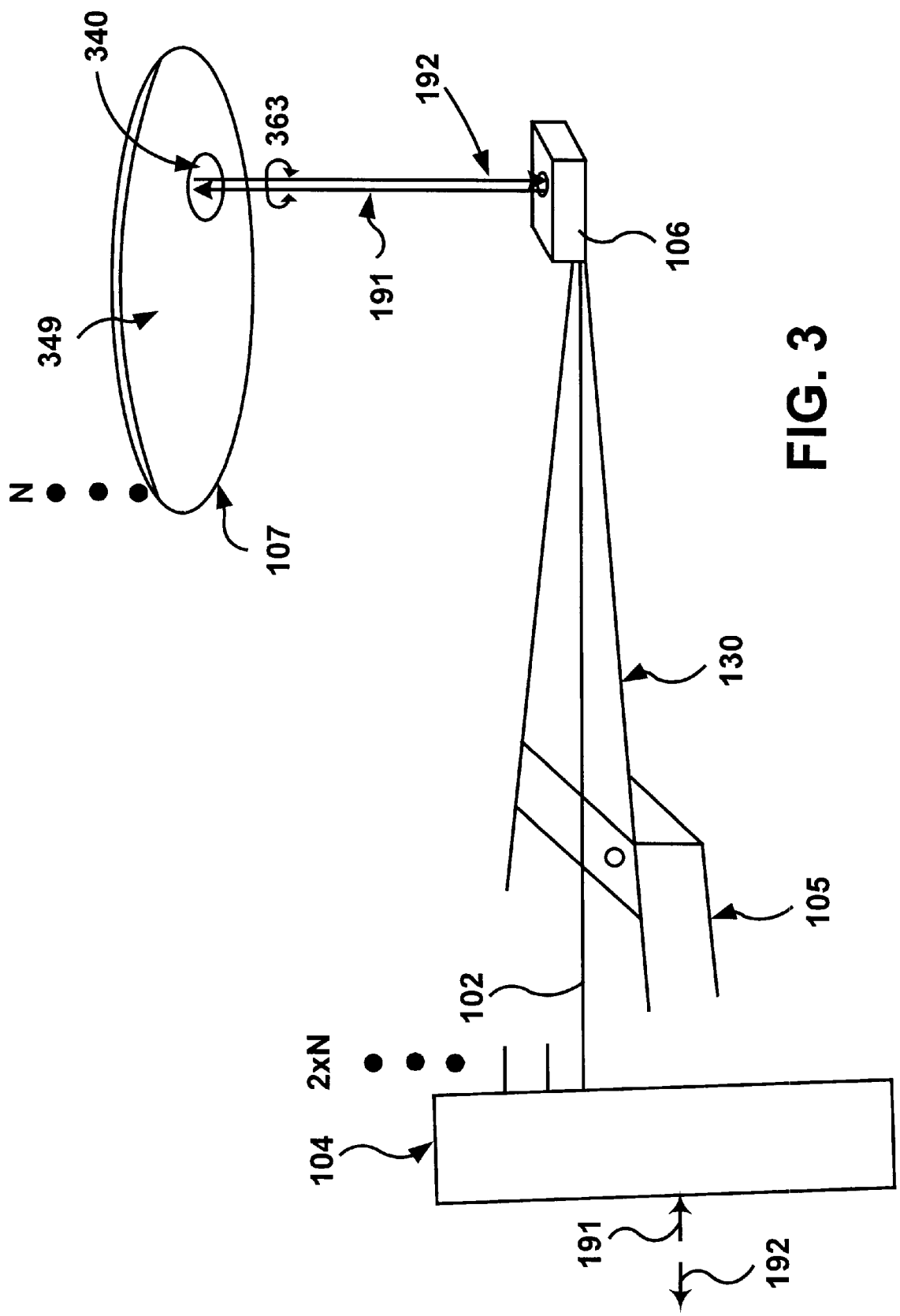
FIG. 3 is a diagram showing an optical path that includes one of the optical fibers and the optical switch.

FIG. 3 is a diagram showing an optical path that includes one of the optical fibers and the optical switch. In a preferred embodiment, a representative optical path is shown in FIG. 3 to include: the optical switch 104, one of the set of single-mode PM optical fibers 102, and one of the set of flying MO heads 106. The optical switch 104 provides sufficient degrees of selectivity for directing the outgoing laser beam 191 (with reference to laser source 231) to enter a respective proximal end of a respective single-mode PM optical fiber 102. The outgoing laser beam 191 is further directed by the single-mode PM optical fiber 102 to exit a respective distal end so as to pass through the flying MO head 106 onto a surface recording layer 349 of a respective MO disk 107.

During writing of information, the outgoing laser beam 191 is selectively routed by the optical switch 104 to the MO disk 107 so as to lower a coercivity of the recording layer 349 by heating a selected spot of interest 340 to approximately the Curie point of the recording layer 349. Preferably, the optical intensity of outgoing laser beam 191 is held constant, while a time varying vertical bias magnetic field is used to define a pattern of "up" or "down" magnetic domains perpendicular to the MO disk 107. This technique is known as magnetic field modulation (MFM). Alternatively, outgoing laser beam 191 may be modulated in synchronization with the time varying vertical bias magnetic field at the spot of interest 340 in order to better control domain wall locations and reduce domain edge jitter. Subsequently, as the selected spot of interest 340 cools at the recording layer 349, information is encoded within the recording layer 349 of the respective spinning disk 107.

During readout of information, the outgoing laser beam 191 (at a lower intensity compared to writing) is selectively routed to the MO disk 107 such that at any given spot of interest 340, the Kerr effect causes (upon reflection of the outgoing laser beam 191 from the surface layer 349) a reflected laser beam 192 to have a rotated polarization of either clockwise or counter clockwise sense 363 that depends on the magnetic domain polarity at the spot of interest 340.

The aforementioned optical path is bi-directional in nature. Accordingly, the reflected laser beam 192 is received through the flying MO head 106 and enters the distal end of the single-mode PM optical fiber 102. The reflected laser beam 192 propagates along the single-mode PM optical fiber 102 to exit at its proximal end and is selectively routed by the optical switch 104 for transmission to laser-optics assembly 101 for subsequent conversion to the signal 294.

Figure 4A:
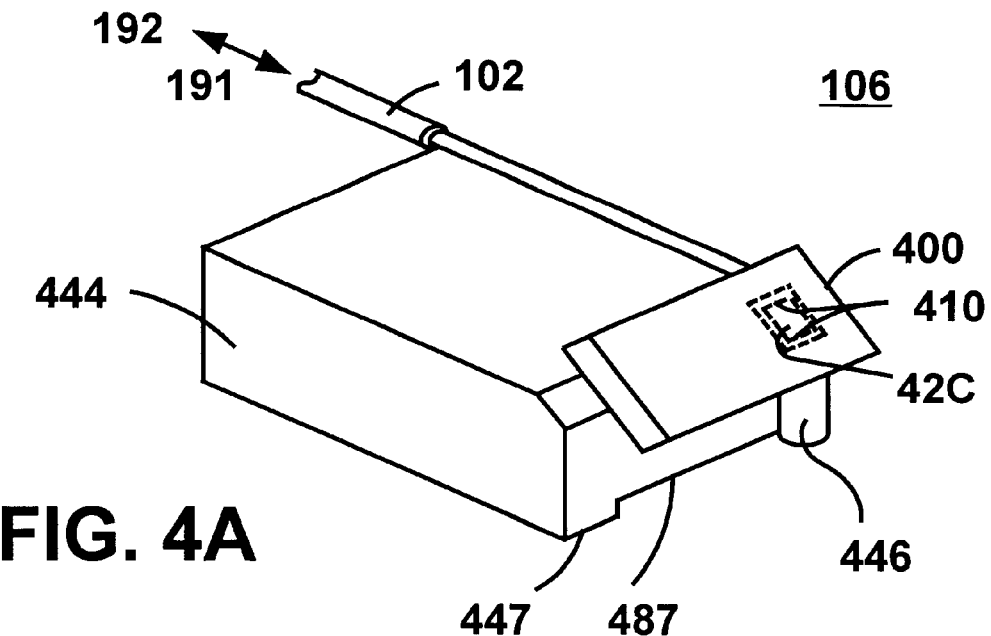
FIGS. 4a–g are diagrams showing the flying magneto-optical head in a perspective, a side cross-sectional, an expanded cross-section, a side, a front, a bottom, and a rear view, respectively.

FIGS. 4a–g are diagrams showing the flying magneto-optical head of the magneto-optical data storage in a perspective, a side cross-sectional, an expanded cross-section, a side, a front, a bottom, and a rear view, respectively. In FIG. 4a, the flying MO head 106 is shown for use above a surface recording layer 349 of one of the set of MO disks 107. The flying MO head 106 includes: a slider body 444, an air bearing surface 447, a quarter-wave plate 493, a reflective substrate 400, an objective optics 446, a magnetic coil 460, and a yoke 462. The slider body 444 is dimensioned to accommodate the physical size, numerical aperture (NA), and working distances between the objective optics 446, the single-mode PM optical fiber 102, and the reflective substrate 400. The reflective substrate 400 may include a reflective surface which is aligned so as to direct the outgoing laser beam 191 and 192 to and from the surface recording layer 349. Although, slider body 444 may include industry standard "mini", "micro", "nano", or "pico" sliders, alternatively dimensioned slider bodies 444 may also be used (as determined by the aforementioned dimensional constraints of the elements used with the flying MO head 106). Accordingly, in a preferred embodiment, the slider body 444 comprises a mini slider height (889 um) and a planar footprint area corresponding to that of a nano slider (1600×2032 um).

The single-mode PM optical fiber 102 is coupled to the slider body 444 along an axial cutout 443, and the objective optics 446 is coupled to the slider body 444 along a vertical corner cutout 411. Although, in the preferred embodiment the axial cutout 443 is located along a periphery of the slider body, and the vertical cutout 411 is located at a corner of the slider body 444, the axial cutout 443 and the vertical cutout 411 may be located at other positions on the flying MO head 106, for example, between the periphery and a central axis or, alternatively, along the central axis itself. Those skilled in the art will recognize that positioning the optical fiber 102 and the objective optics 446 at other than along a central axis may function to affect a center of mass of the magneto-optical head 106 and, thus, its flying dynamics. Accordingly, the point of attachment of the flying MO head 106 to the suspension may require adjustment to compensate for off-center changes in the center of mass of the magneto-optical head 106. Preferably, the cutouts 443 and 411 may be designed as channels, v-grooves, or any other suitable means for coupling and aligning the single-mode optical fiber 102 and objective optics 446 to the flying MO head 106. In the preferred embodiment, the laser beams 191 and 192 traverse an optical path (to and from the surface recording layer 349 of the MO disk 107) that includes: the single-mode PM optical fiber 102, the reflective substrate 400, the quarter-wave plate 493, and the objective optics 446. In the preferred embodiment, the single-mode PM optical fiber 102 and the objective optics 446 are positioned within their respective cutouts to achieve focus of the outgoing laser beam 191 within the spot of interest 340 as a focused optical spot 448. The single-mode PM optical fiber 102 and the objective optics 446 may be subsequently secured in place by using ultraviolet curing epoxy or similar adhesive. As compared to free space delivery of polarized laser light, the single-mode PM optical fiber 102 provides an accurate means of alignment and delivery of both the outgoing 191 laser beam to the reflective substrate 400, and of the reflected laser beam 192 from the reflective substrate 400 back to the laser-optics assembly 101. The single-mode optical fiber 102 also provides a low mass and low profile optical path. The low mass of the single-mode optical fiber 102 provides a method of delivering light to the flying MO head 106 without interfering substantially with the operating characteristics of the actuator arm 105 and suspension 130. The low profile of the single-mode optical fiber 102 provides the ability to reduce the distance between a set of MO disks without interfering with delivery of light or operation of the flying MO head 106. The reflective substrate 400, quarter-wave plate 493, and objective optics 446 are of a preferably compact and low mass so as to fit within a physical volume approximating the rectangular volumetric dimensions of the slider body 444 and, yet, sufficiently large to direct a full cross section of the outgoing and reflected laser beams 191 and 192 so that minimal power is lost and significant distortion and aberrations in the outgoing and reflected laser beams 191 and 192 are not introduced.

Figure 5:
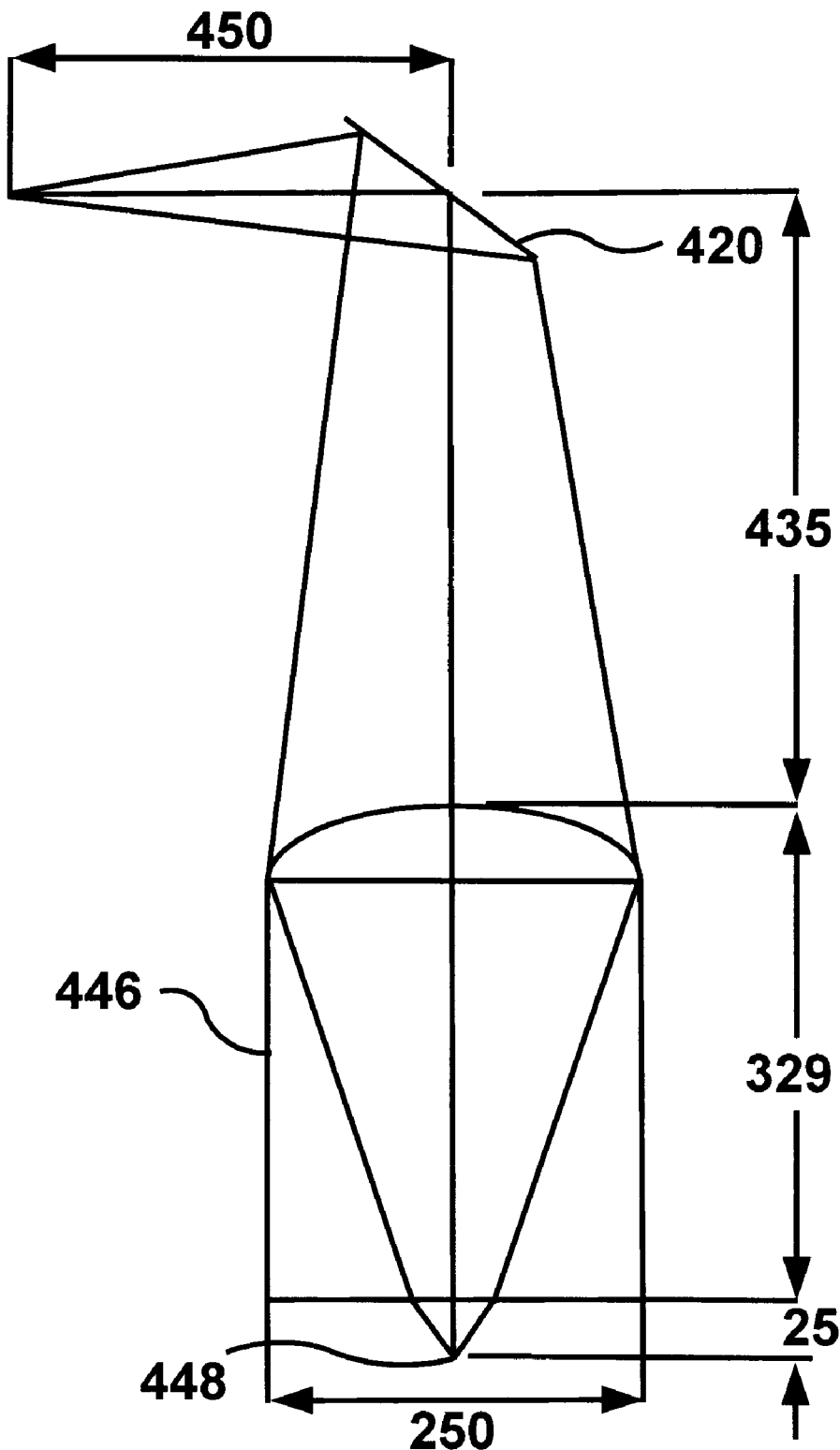
FIG. 5 is a diagram showing an embodiment of the GRIN lens.

FIG. 5 is a diagram showing an embodiment of the GRIN lens. As is discussed below, the present invention includes very small and low profile objective optics 446. In the preferred embodiment, the objective optics 446 includes a micro plano-convex GRIN lens (Graded Index) lens of a non-conventional design that provides a high effective NA, low size, and low mass single-element objective optics for use with the flying MO head 106. In the preferred embodiment, this goal is achieved by polishing a conventional plano-plano GRIN rod lens so as to provide a convex surface at one end of the GRIN rod lens. In an exemplary embodiment, the objective optics 446 is a cylindrical plano-convex GRIN lens that includes at a bottom end a plano surface and at an opposite end a convex surface with a radius of curvature of 190 um. As compared to the prior art, the cylindrical and planar portions of the GRIN lens 446 improve the ability to align an optical axis of the objective optics 446 relative to the representative optical path passing through the respective cutout 411 (FIG. 4*f*) of the flying MO head 106. Use of a single optical element GRIN lens 446 eliminates a prior art requirement for alignment of multiple objective optic elements relative to each other. In an exemplary embodiment, the GRIN lens 446 diameter is approximately 0.250 um, and the GRIN lens 446 length is approximately 329 um. An optical path length from a center point of the reflective central mirror portion 420 to the convex surface of the GRIN lens 446 is approximately 435 um. The single-mode PM optical fiber 102 has an NA of approximately 0.15, and the distal end of the single-mode PM optical fiber 102 is positioned approximately 450 um from the center point of the reflective central mirror portion 420. The GRIN lens 446 comprises a gradient index function of sqrt(A)=3.2, which provides an effective NA of approximately 0.67. In an exemplary embodiment, in which the laser-optics source 231 (FIG. 2) operates at a wavelength of 650 nm, over the propagation angle of the outgoing laser beam 191, and as the reflective central mirror portion 420 rotates, the optical spot 448 is preferably maintained with a full width at half-maximum intensity (FWHM) of approximately 0.54 um and with a RMS wavefront error of approximately $\lambda/20$ at a point approximately 25 um below the convex surface of the GRIN lens 446. The GRIN lens objective optics 446, therefore, provides a small size and low mass high NA micro-objective element that is easy to align within the flying MO head 106 during manufacture. One exemplary embodiment of a plano-convex GRIN lens has been described above; however, it will be appreciated that the GRIN lens 446 may comprise other geometries.

As is discussed above, the present invention uses objective optics 446 that are manufactured to very small dimensions. The optical and geometrical properties of the objective optics 446 permit a low profile and small diameter magnetic coil 460 and yoke 462 to be mounted on a bottom surface of the flying MO head 106 or, alternatively, on or near the surface of the objective optics 446, without affecting the aerodynamic flying qualities of the flying MO head 106.

Figure 4B:
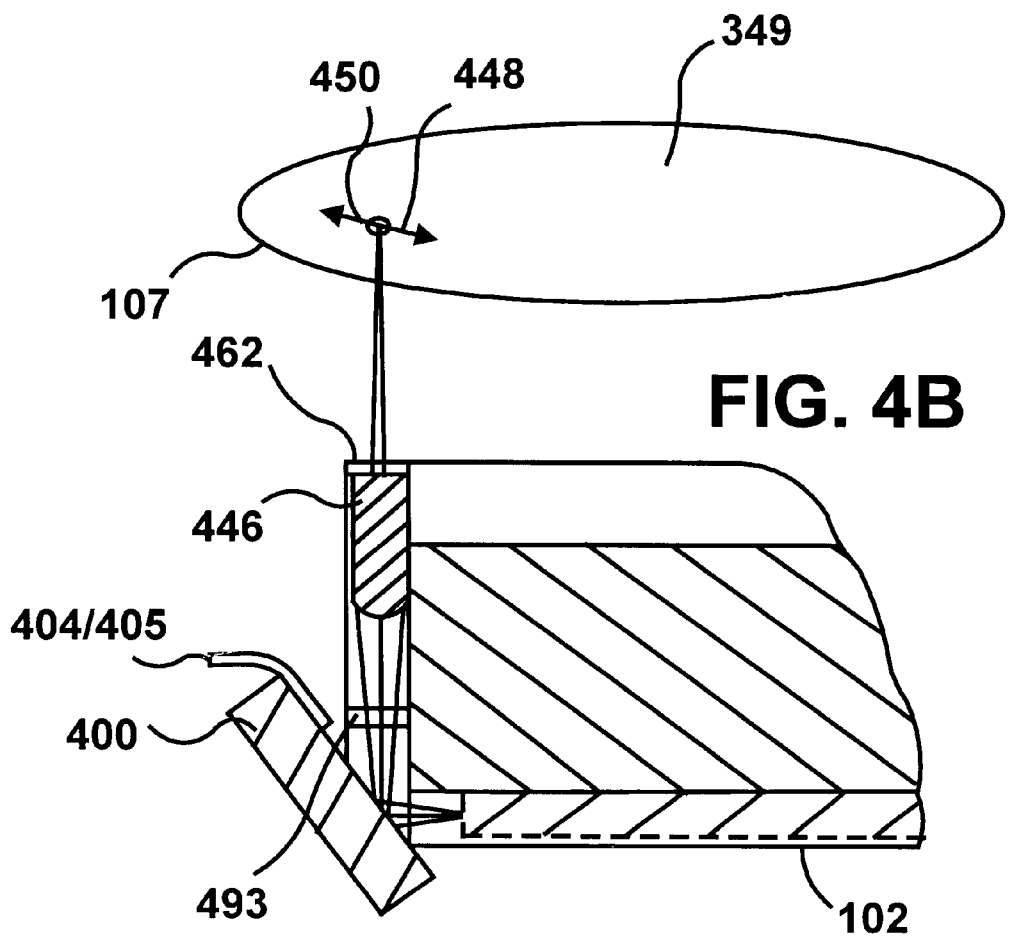

In an exemplary embodiment, the reflective substrate 400 may comprise a steerable micro-machined mirror assembly. In the preferred embodiment, the steerable micro-machined mirror assembly 400 includes a small (in one embodiment, less than 300 um square) reflective central mirror portion 420 (illustrated in FIG. 4*a* by dashed lines representative of the reflective central mirror portion on a side of the steerable micro-machined mirror assembly 400 opposite to that which is visible). The small size and mass of the steerable micro-machined mirror 400 contributes to the ability to design the flying MO head 106 with a low mass and a low profile. As used in the magneto-optical storage and retrieval system 100, fine tracking and short seeks to a series of nearby tracks may be performed by rotating the reflective central mirror portion 420 about a rotation axis so that the propagation angle of the outgoing laser beam 191 is changed before transmission to the objective optics 446. The reflective central mirror portion 420 is rotated by applying a differential voltage to a set of drive electrodes 404/405 (FIG. 4*b*). The differential voltage on the electrodes creates an electrostatic force that rotates the reflective central mirror portion 420 about a set of axial hinges 410 and enables the focused optical spot 448 to be moved in the radial direction of the MO disk 107. In the exemplary embodiment, a rotation of approximately +/−2 degrees of the reflective central mirror portion 420 is used for movement of the focused optical spot 448 in an approximately radial direction 450 of the MO disk 107 (equivalent to approximately +/−4 tracks) for storage and retrieval of information, track following, and seeks from one data track to another data track. In other embodiments, other ranges of rotation of the reflective central mirror portion 420 are possible. Coarse tracking may be maintained by adjusting a current to the rotary actuator magnet and coil assembly 120 (FIG. 1). The track following signals used to follow a particular track of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks. If embossed pits are used, those skilled in the art will recognize that an adder output circuit may be used in combination with the differential output circuit 237. In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, in another embodiment, irrespective of the movement of the set of actuator arms 105 and set of suspensions 130, a set of the steerable micro-machined mirror assemblies 400 of the present invention may be used to operate independently and thus permit track following and seeks so as to read and/or write information using more than one MO disk surface at any given time. Independent track following and seeks using a set of concurrently operating steerable micro-machined assemblies 400 would preferably require a set of separate respective read channel and fine track electronics and mirror driving electronics. Because the aforementioned embodiment would also preferably require use of separate laser-optics assemblies 101, an optical switch 104 for switching between each of the separate optical paths would not necessarily be required.

Figure 6:
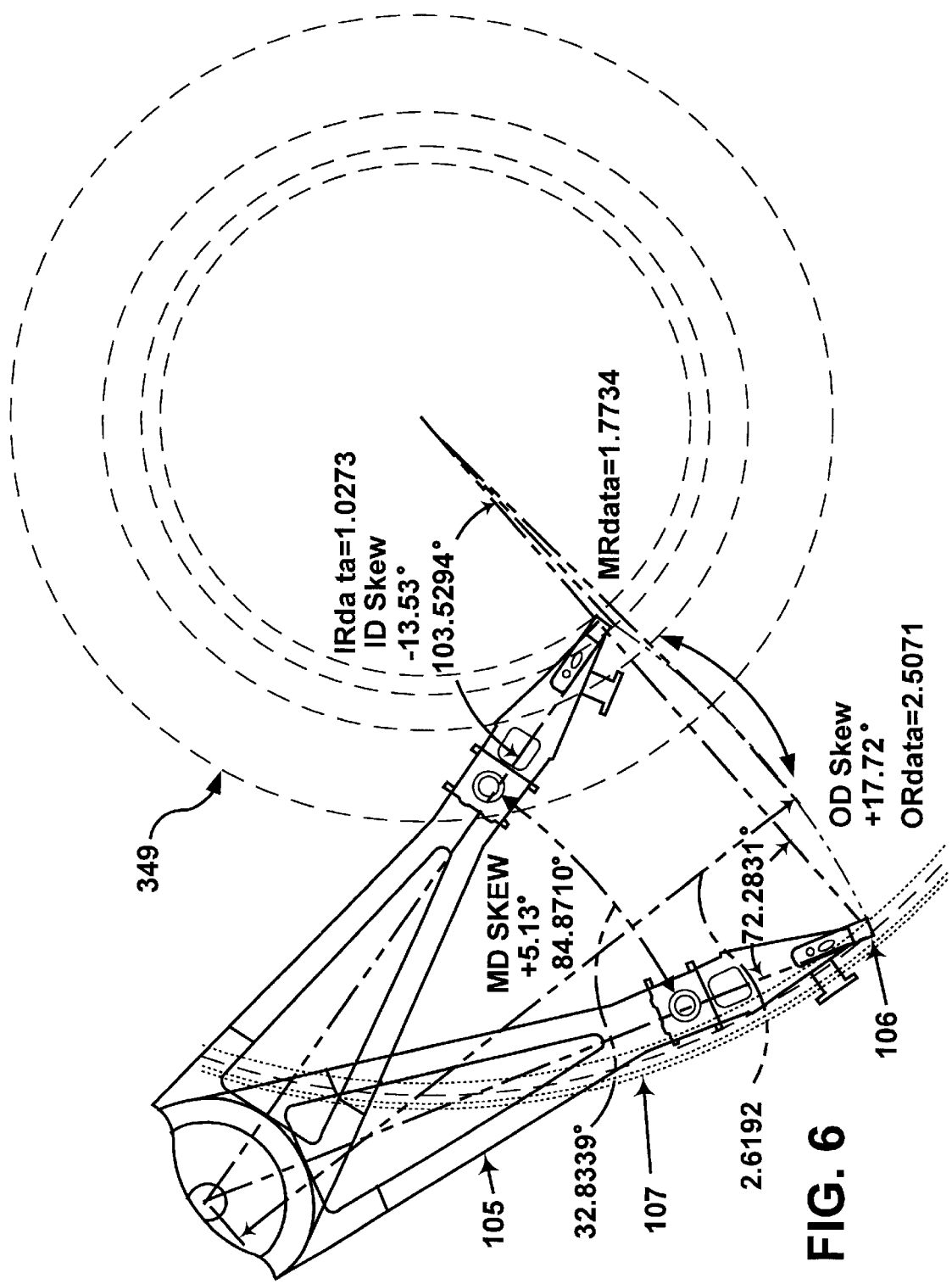
FIG. 6 is a diagram of a magneto-optical head used over a surface of a magneto-optical disk.

FIG. 6 is a diagram of a magneto-optical head used over a surface of a magneto-optical disk. In the preferred embodiment, the excursion of the optical spot formed by the GRIN lens objective optics 446 over the surface recording layer 349 of the MO disk 107 is limited (at an outer radius) by a requirement that the flying MO head 106 maintain a stable aerodynamic flying height and (at an inner radius) by mechanical constraints of the magneto-optical (MO) data storage and retrieval system 100 that limit movement of the actuator arm 105. Accordingly, in an exemplary embodiment, the objective optics 446 may access a maximum usable area of the surface recording layer 349 that comprises a minimum inner radius $r_i$ is 26.093 mm and a maximum outer radius $r_o$ that is 63.680 mm. In the exemplary embodiment, the MO disk 107 comprises 1406.5 data tracks/mm (e.g., a track pitch of 0.711 um), and the flying MO head 106 is oriented over the MO disk 107 at the maximal inner excursion with a skew angle of −13.53 degrees and at the maximal outer excursion with a skew angle of 17.72 degrees (relative to tangential lines drawn at the radial data tracks located at the intersection point of the optical spot formed by the objective optics 446 and the minimum inner and maximum outer radii of the surface recording layer 349, respectively). In the exemplary embodiment, the areal density over all the MO disk 107 radii is maximized using "zone recording" techniques to achieve an exemplary local area density of approximately 3.6 Gb per square inch. A maximum user data rate at the outer radius of the MO disk 107 comprises at least 120 Mbits/sec (at a rotation rate of approximately 4500 RPM). Those skilled in the art will recognize that the user data rate $R_D$ may be calculated using the relationship $R_D=(v)\times(D_L)$ (where v=disk velocity and $D_L$=linear bit density of the MO disk 107). The disk velocity $v_0$ at the outer radius of the MO disk 107 may be calculated using the relationship $v_0=r_0\omega=$ (63.680 mm)×(2π rad/rev)×(4500 rev/60sec)=30.008 m/s. Accordingly, the linear bit density $D_L$ required to sustain the desired maximum user data rate at the outer radius may be calculated using the relationship $D_L=R_D/v_0=$(120 Mbits/ sec)/(30.008 m/s)=3998.9 bits/mm.

Figure 7:
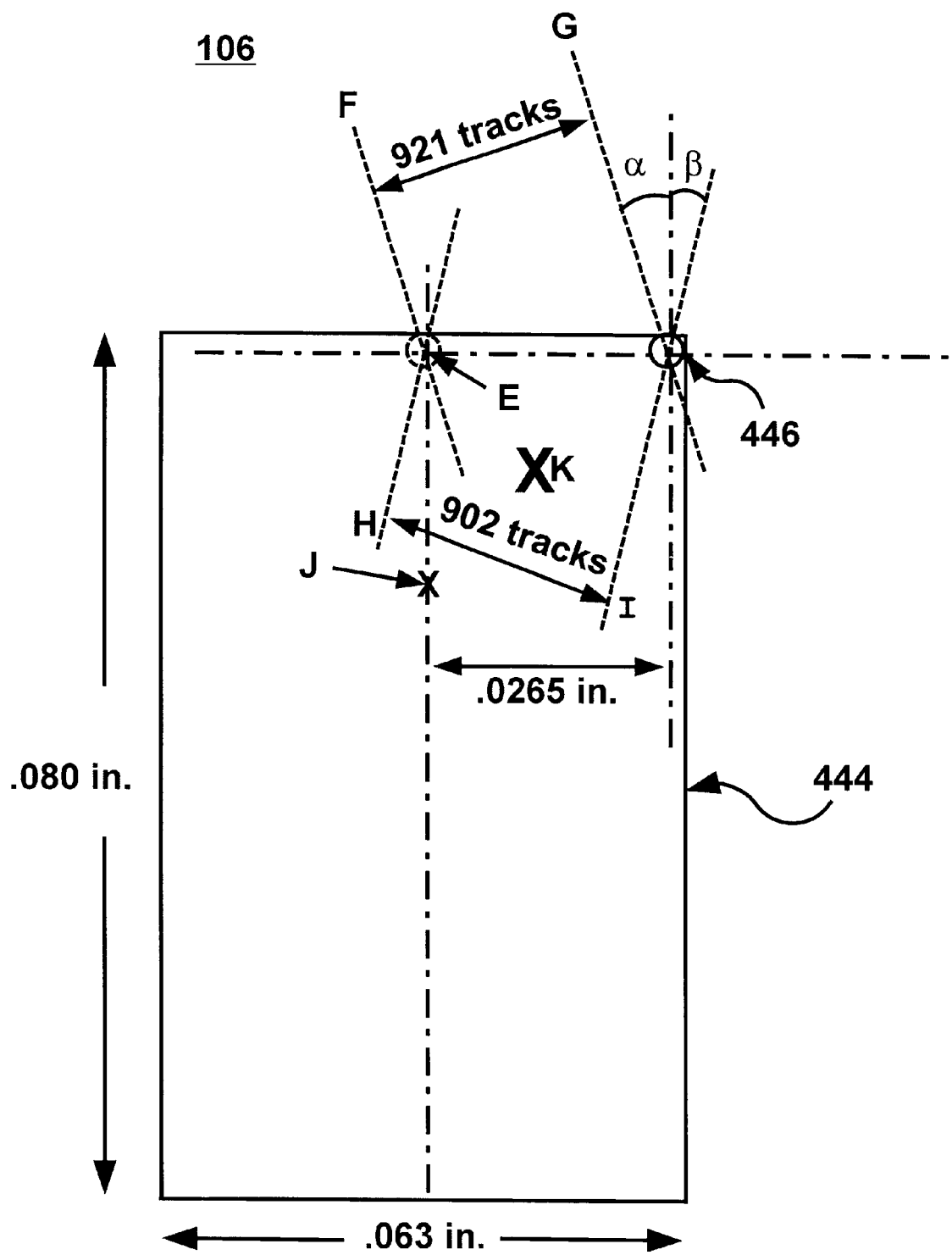
FIG. 7 is a diagram illustrating the data tracks that are gained and lost by positioning the objective optics and magnetic coil at a corner of the magneto-optical head.

FIG. 7 is a diagram illustrating the data tracks that are gained and lost by positioning the objective optics and magnetic coil at a corner of the magneto-optical head. Those skilled in the art will recognize that use of objective optics along a central axis and inward from a periphery of a flying MO head results in data tracks at the outer radius of a respective MO disk that may not be accessed. In the present invention, because the GRIN lens objective optics 446 and the magnetic coil 460 are located towards or at a periphery of the flying MO head 106 (as compared to objective optics 446 located inward from the periphery and along a central axis of the flying MO head 106), the radial data tracks that may be accessed at the outer excursion of the flying MO head 106 is offset by approximately an equal number of radial data tracks that are inaccessible at the inner excursion of the flying MO head 106. The present invention makes use of the increased recording capacity of the data tracks at the outer radii as compared to the recording capacity of the data tracks at the inner radii. As compared to the prior art, by positioning the objective optics 446 and magnetic coil 460 offset from the central axis, the present invention increases the amount of data that may be written and read using the MO disk 107.

Figure 12:
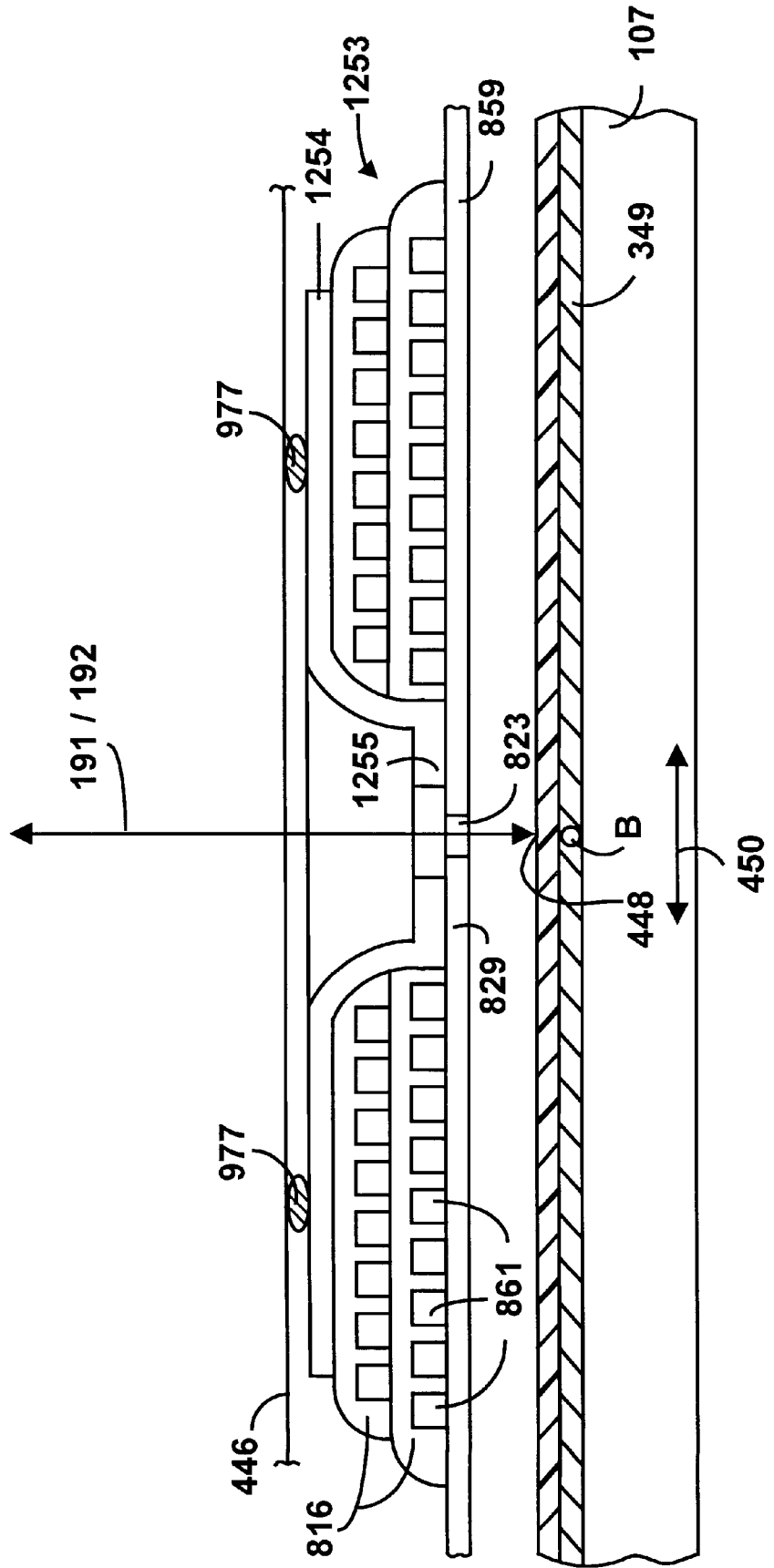
FIG. 12 is a view of another embodiment of an elongated magnetic coil.

The increase in data that may be accessed from the surface recording layer 349 of the MO disk 107 may be illustrated by comparing a position of the objective optics 446 and the magnetic coil 460 at a corner of the flying MO head 106 to an exemplary objective optics and a magnetic coil positioned along a central axis. In FIG. 12, this comparison is illustrated by a perpendicular distance between a tangential line drawn at a radial data track located at the optical spot formed by the objective optics 446 and a tangential line drawn at a radial data track located under point E. In the exemplary embodiment, the objective optics 446 and the magnetic coil 460 are placed 0.0265 inches off-center from the central axis at a corner of the flying MO head 106. In the exemplary embodiment, at the maximal outer excursion of the flying MO head 106, the perpendicular distance between the tangential lines (F and G) may be calculated as $d_o=$ (0.0265 in)×(cos 17.72 degrees)=0.02525 in=641.165 um and at the maximum inner excursion between the tangential lines (H and I) as $d_i=$(0.0265 in.)×(cos 13.53 degrees)= 0.025765 in=654.42 um. Accordingly, compared to point E, the placement of the objective optics 446 and magnetic coil 460 at a corner of the flying MO head 106 results in a gain of approximately 902 data tracks at the maximal outer excursion of the flying MO head 106 (e.g., 641.165 um/0.711 um/track), and a loss of approximately 921 tracks at the maximal inner excursion of the flying MO head 106 (e.g., 654.42 um/0.711 um/track). In the exemplary embodiment, the data gained with the maximal outer excursion of the flying MO head 106 may be calculated using the relationship $C_O=$(902 tracks)×$(D_L)$×(2π)×$(r_o')$, where $r_o'$ is a mean radius of the recording tracks gained (calculated as $r_o-$(0.5)×(641.165 um)=63.3594 mm), and the data lost with the maximal inner excursion of the MO head 106 may be calculated from the relationship $C_i=$(921 tracks)×$(D_L)$× (2π)×$(r_i')$, where $r_i'$ is a mean radius of the recording tracks lost (calculated as $r_i-$(0.5)×(654.42 um)=26.4202 mm). Accordingly, $C_O$=1.43595 Gb=179.493 MB, and $C_i$=0.061139 Gb=76.423 MB. Compared to objective optics positioned at point E on the flying MO head 106, the exemplary embodiment discussed above provides a net gain of 103.070 MegaBytes that may be read and written from the MO disk 107. Thus, compared to prior art objective optics located along a central axis and inward from the periphery of an MO head (e.g., point F), placement of the objective optics 446 and the magnetic coil 460 at the periphery of the flying MO head 106 provides an increase in the amount of data that may be read and written by the magneto-optical (MO) data storage and retrieval system 100. Although, the objective optics 446 has been described as being located along a periphery of the flying MO head 106, other positions of the objective optics 446 and magnetic coil 460 may also provide improved data access.

Figure 8:
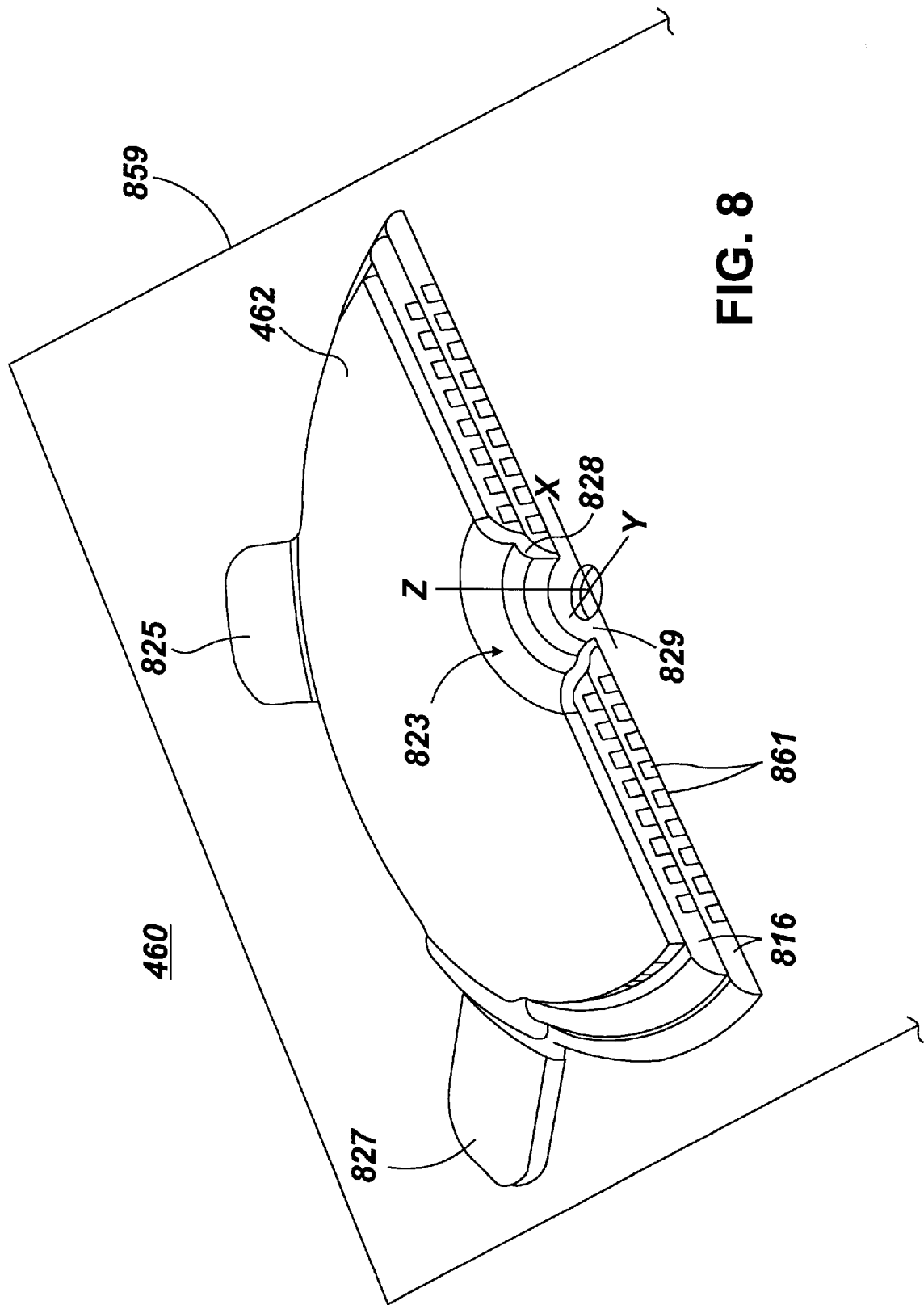
FIG. 8 is a diagram showing a magnetic coil assembly in a representative cutaway view.
Figure 9:
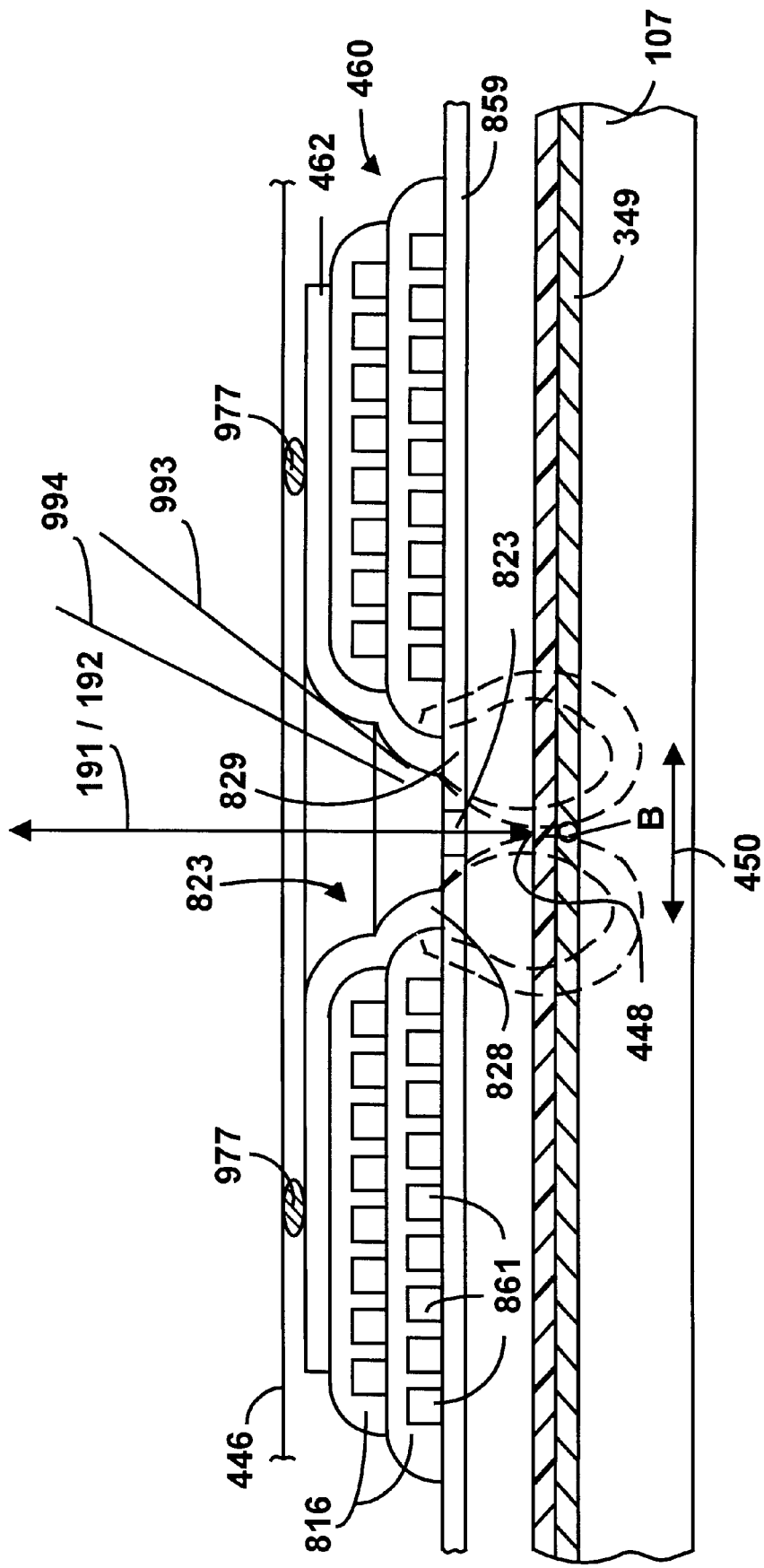
FIG. 9 is a diagram showing the magnetic coil assembly in a second representative cutaway view.

FIGS. 8 and 9 are diagrams showing a magnetic coil assembly in two representative cutaway views. In a preferred embodiment, the magnetic coil 460 is a planar microcoil that includes a conductor 861, which is coiled and housed at least partly within a yoke (or permeable flux guide) 462, and encapsulated within an insulation layer 816. In a preferred embodiment, the insulation layer 816 includes a suitable dielectric material, such as a photo-resist material. Although, in the preferred embodiment, the magnetic coil 460 and yoke 462 may be formed on a suitable dielectric protective layer 859, it is understood that use of the magnetic coil assembly of the present invention without a protective layer 859 is also possible. The protective layer 859 preferably includes an aperture formed sufficiently wide for ensuring passage of the outgoing 191 and reflected 192 laser beams (FIG. 1) through a central passage 823 defined by a sloped portion of the yoke 462. The sloped portion of the yoke 462 extends (through a plane defined by at least one layer of the conductor 861) towards the central passage 823, terminating at a tip portion 829 of the protective layer 859. In another embodiment, the magnetic coil 460 and yoke 462 may be partly encapsulated within an overcoat (not shown) for added protection and insulation.

In the preferred embodiment the yoke 462 enhances a magnetic field created by the magnetic coil 460 at the surface 349 layer of the MO disk 107. The sloped portion of the yoke 462 preferably further optimizes enhancement of the magnetic field. In an exemplary embodiment, the yoke 462 is made of a ferromagnetic material having a permeability of approximately 2000, for example, a nickel iron alloy (NiFe), and the yoke ranges in thickness from approximately 4 um to approximately 6 um. In one embodiment, the yoke tip 828 terminates at the upper surface of the protective layer 859 to preferably generate a maximal magnetic field at or near a point (B) within the surface 349 layer of the MO disk 107 (FIG. 9 illustrates the magnetic field lines with in dashed lines).

Figure 4C:
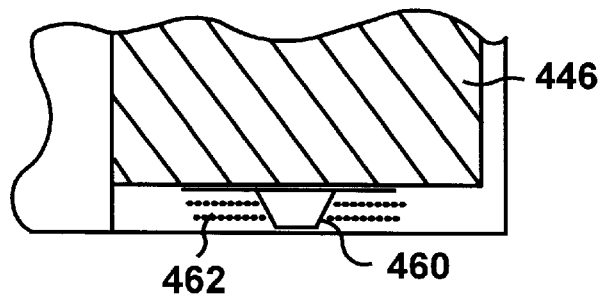
Figure 4D:
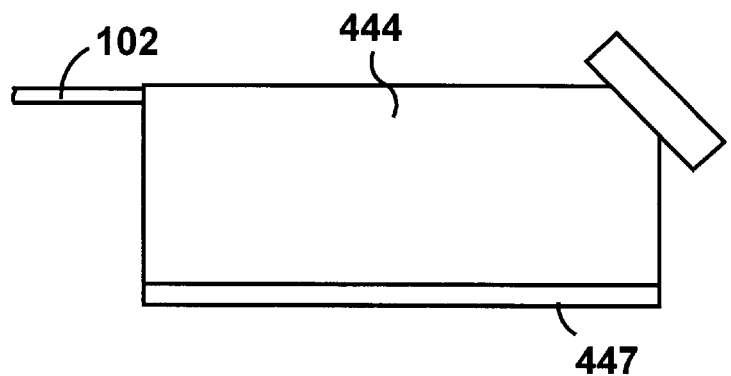
Figure 4E:
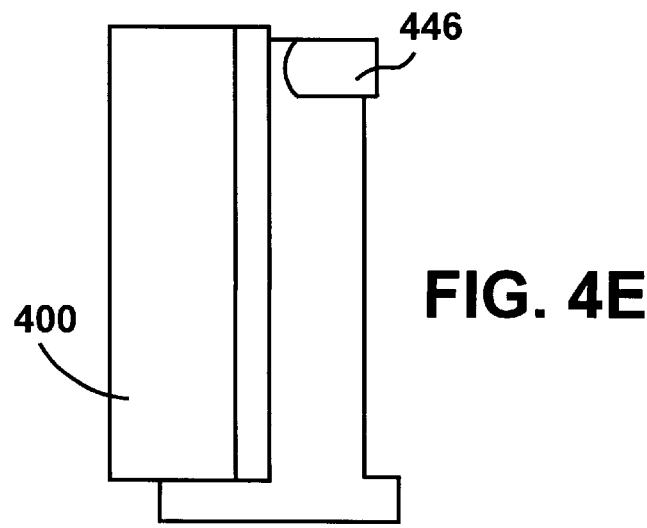
Figure 4F:
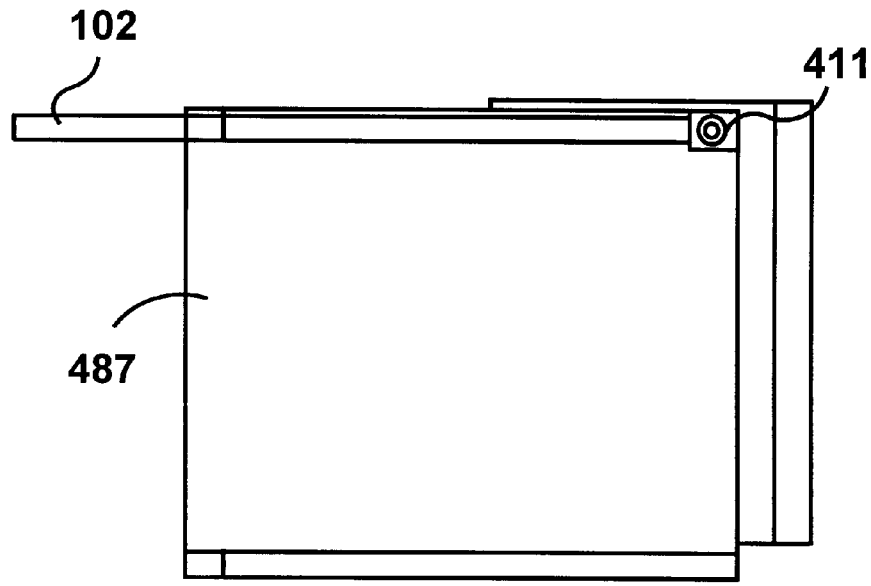
Figure 4G:
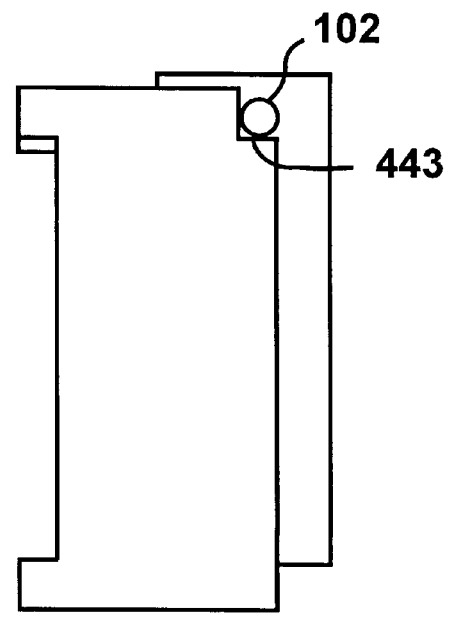

As shown in FIG. 4c, the magnetic coil 460 and the yoke 462 are mounted horizontally near the air-bearing surface 447 at, or in proximity to, the lower surface of the objective optics 446 and are centered with respect to an optical axis of the objective optics 446. The conductor 861 may comprise a suitable conductor, such as copper, that is coiled to comprise between 15 to 40 turns or, preferably, 21 turns. Preferably, the magnetic coil 460 includes two layers spaced apart in a vertical direction by approximately 6 um. It is understood, however, that in other embodiments, fewer of greater numbers of layers, vertical spacings other than 6 um, as well as fewer or greater numbers of turns are possible. In an exemplary embodiment, a cross-sectional area of the conductor 861 may vary between approximately 2 um and 7 um. In a more specific embodiment, a cross-sectional geometry of the conductor 861 includes a height of approximately 3 um and a width of approximately 2 um. It should be understood that other cross-sectional geometries for the conductor 861 are possible, for example, circular or square cross-sections.

In the preferred embodiment, the magnetic coil 460, the coiled conductor 861, and yoke 462 include a generally elongated geometry. More specifically the magnetic coil 460 (hereinafter referred to as an elongated magnetic coil), the coiled conductor 861 and yoke 462 include an elliptical geometry. In an exemplary embodiment, the outermost dimension of the conductors 861 along the major axis of the elongated magnetic coil 460 is less than approximately 150 microns and along the minor axis less than approximately 120 microns, and the innermost dimension of the conductor 861 along the major axis of the elongated magnetic coil 460 is less than approximately 50 microns and along the minor axis less than approximately 40 microns. In the exemplary embodiment, an innermost dimension of the yoke 462 along the major axis of the elongated magnetic coil 460 is less than approximately 25 microns and along the minor axis less than approximately 20 microns.

Compared to a circular magnetic coil that includes inner and outer dimensions that are equivalent to the inner and outer dimensions of the elongated magnetic coil 460 along the major axis, the elongated magnetic coil 460 provides an advantage in z-axis magnetic field generation efficiency and self-inductance that is better optimized with respect to the required function of moving the optical spot 448 in the disk radial direction 450 by means of the range of motion of the reflective central mirror portion 420 during fine tracking and short seeks to adjacent tracks of a MO disk 107. The elongated magnetic coil 460 geometry provides a denser magnetic field at the surface of the MO disk 107 than would be possible with the aforementioned circular coil. In the preferred embodiment, use of the elongated magnetic coil 460 in combination with the yoke 462 further enhances the magnetic field, preferably, by a factor of approximately two. The low profile and low mass of the elongated magnetic coil 460 and associated yoke 462 minimize interference with the aerodynamic flying qualities of the flying MO head 106 such that the flying MO head 106 and, therefore, the elongated magnetic coil 460 and associated yoke 462 may be positioned close to the MO disk 107. The small diameter of the elongated magnetic coil 460 and yoke 462 provides further benefit, in that, smaller data marks than the prior art may be recorded.

An exemplary cross-section of the elongated magnetic coil 460 along constraining linear boundaries at extent of the inner diameter of the conductors 861 and the permeable yoke 462 is illustrated in the cross-section shown in FIG. 9. In an exemplary embodiment, the sloped portion of the yoke 462 at an inner diameter is shown in a major axis direction (x-axis) 993 of the elongated magnetic coil 460. The geometry of the sloped portion is a function of the optical path design as defined by the passage of the outgoing laser beam 191 through the central passage 823 during rotation of the reflective central mirror portion 420 (FIG. 4*a*). A different geometry 994 applies in the y-z planes. In the preferred embodiment, even though the outermost diameter of the objective optics 446 is larger than the outermost diameter of the elongated magnetic coil 460, the elongated magnetic coil 460 and yoke 462 do not interfere with the optical passage of light to and from the MO disk 107. In an embodiment (not shown) of the elongated magnetic coil 460 with an outer major axis dimension larger than the dimension of the objective optics 446 (as compared to a circular coil that has an equivalent outer dimension) the outer dimension of the elongated magnetic coil 460 along the minor axis would be useful in terms of permitting placement of the offset objective optics 446 as close to a periphery of the flying MO head 106 and, therefore, to increase the number of outer data tracks of a MO disk 107 that may be accessed.

Although the elongated magnetic coil 460 and yoke 462 have been described to include an elliptical geometry, this geometry may be generalized to other situations in which alterations to the geometry of the elongated magnetic coil 460 and yoke 462 are made to accommodate a range of motion of an optical beam within the central passage 823, while also maintaining minimum spacing between the turns of the conductor 861 with the associated yoke 462 and the application point of a maximum magnetic field B. Accordingly, other elongated magnetic coil 460, yoke 462, and conductor 862 geometries are within the scope of the invention; for example, oval, rectangular, etc. In another embodiment, in which the reflective central mirror portion 420 (discussed above) is fixed, a circular elongated magnetic coil 460 and yoke 462 geometry would be beneficial in forming a magnetic field at point B. In the aforementioned embodiment, a vertical geometry for the sloped portion of the yoke 462 would be useful in generating an optimal magnetic field. In the preferred embodiment, an upper surface of the yoke 462 (and therefore the elongated magnetic coil 460) is secured to the objective optics 446 (FIG. 4*c*) by well known techniques, such as adhesive 977. In another embodiment, the elongated magnetic coil 460 and the yoke 462 may be adhesively secured to the bottom surface 487 (FIG. 4*a*) of the slider body 444 by a plurality of pads, 825 and 827 (Only two pads are illustrated).

Figure 10:
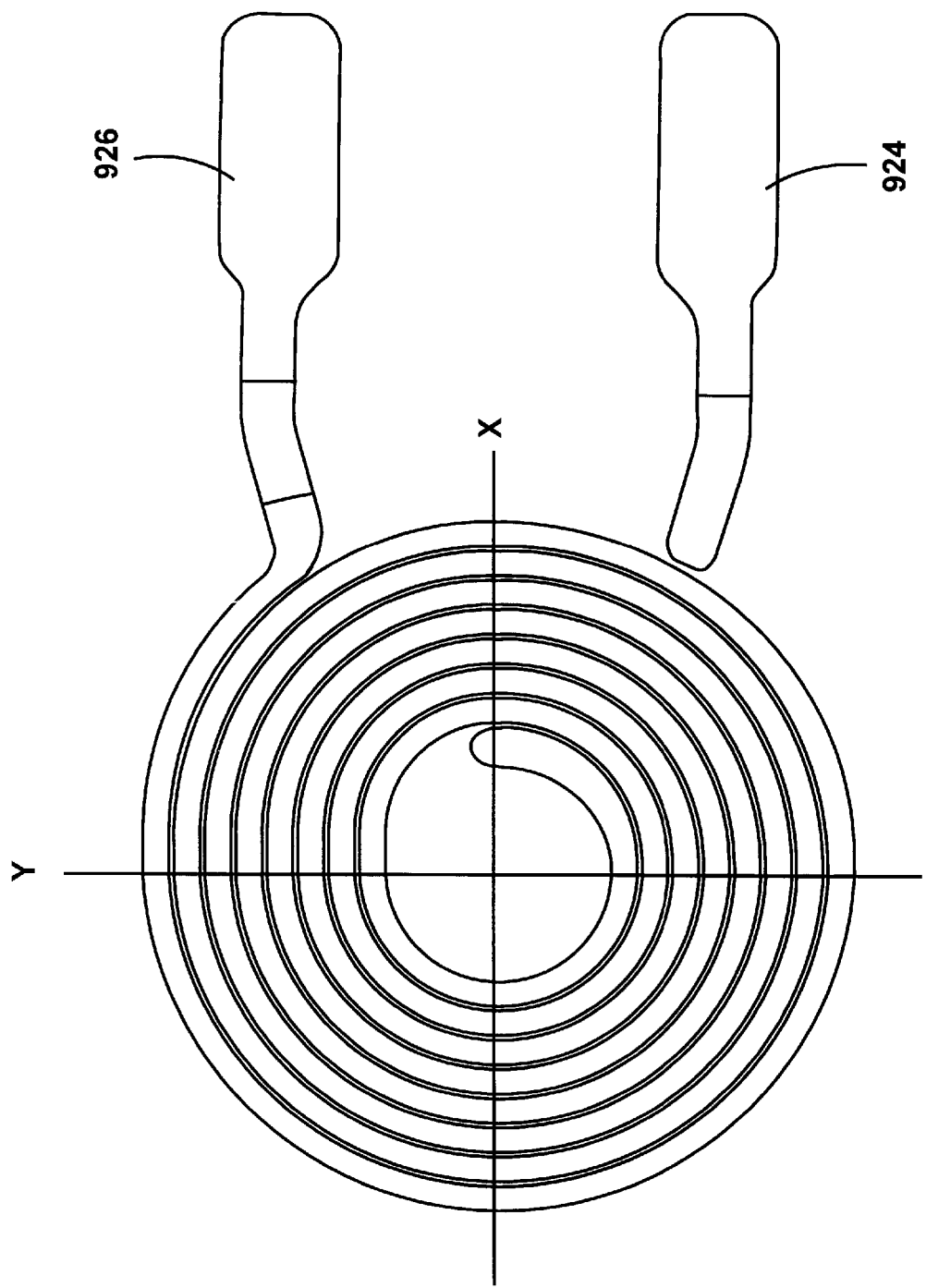
FIG. 10 is a top view of a the elongated magnetic coil.

FIG. 10 is a top view of the conductors of the elongated magnetic coil. In the preferred embodiment, the conductor 861 includes two pads 924, 926 for connection to an electrical circuit. The pads 924, 926 are preferably made of gold traces. In an exemplary embodiment, with an applied current of less than 50 mA, with an input voltage of less than 12 volts, and with a conductor 861 resistance of less than approximately 22 ohms; the elongated magnetic coil 460 exhibits: a self inductance of less than approximately 200 nH, and a capacitance of less than approximately 5 pf. In the exemplary embodiment, the magnetic field component in a plane perpendicular to the plane of the MO disk 107 (+/−15 degrees) is reversible (80%+/−full strength) in a time of 4 ns. In the exemplary embodiment, a separation distance between the tip 828 of the yoke 462 and the surface of the MO disk 107 is approximately 5 um and 10 um such that a magnetic field of about 290 Gauss at point B is generated generally within the boundaries of the optical spot 448 formed by the outgoing laser beam 191. This compares favorably the prior art, which because of bulky size has required positioning at a distance farther away from the magnetic recording media (i.e., at other than the bottom surface of a head). The prior art magnetic coil to recording media distance imposes increased current requirements for generation of equivalent magnetic field densities at a media surface. In contrast, the present invention requires less current to generate an equivalent prior art magnetic field density at the media surface. In addition, due to limitations of self inductance, the increased size and current requirements of the prior art magnetic coils is limited by the rate at which their magnetic field may be switched. In contrast, the reduction in size and current provided by the magnetic coil 460 and yoke 462 increases the rate at which information may be recorded. The bulky prior art coil designs also contribute to head size so as to imposes limits on the number of heads that may be used within any given vertical spacing. Therefore, for any given field strength, use of the yoke 462 in combination with the elongated coil 460 permits a smaller and less bulky flying magnetic head 106 geometry to be used.

Figure 11:
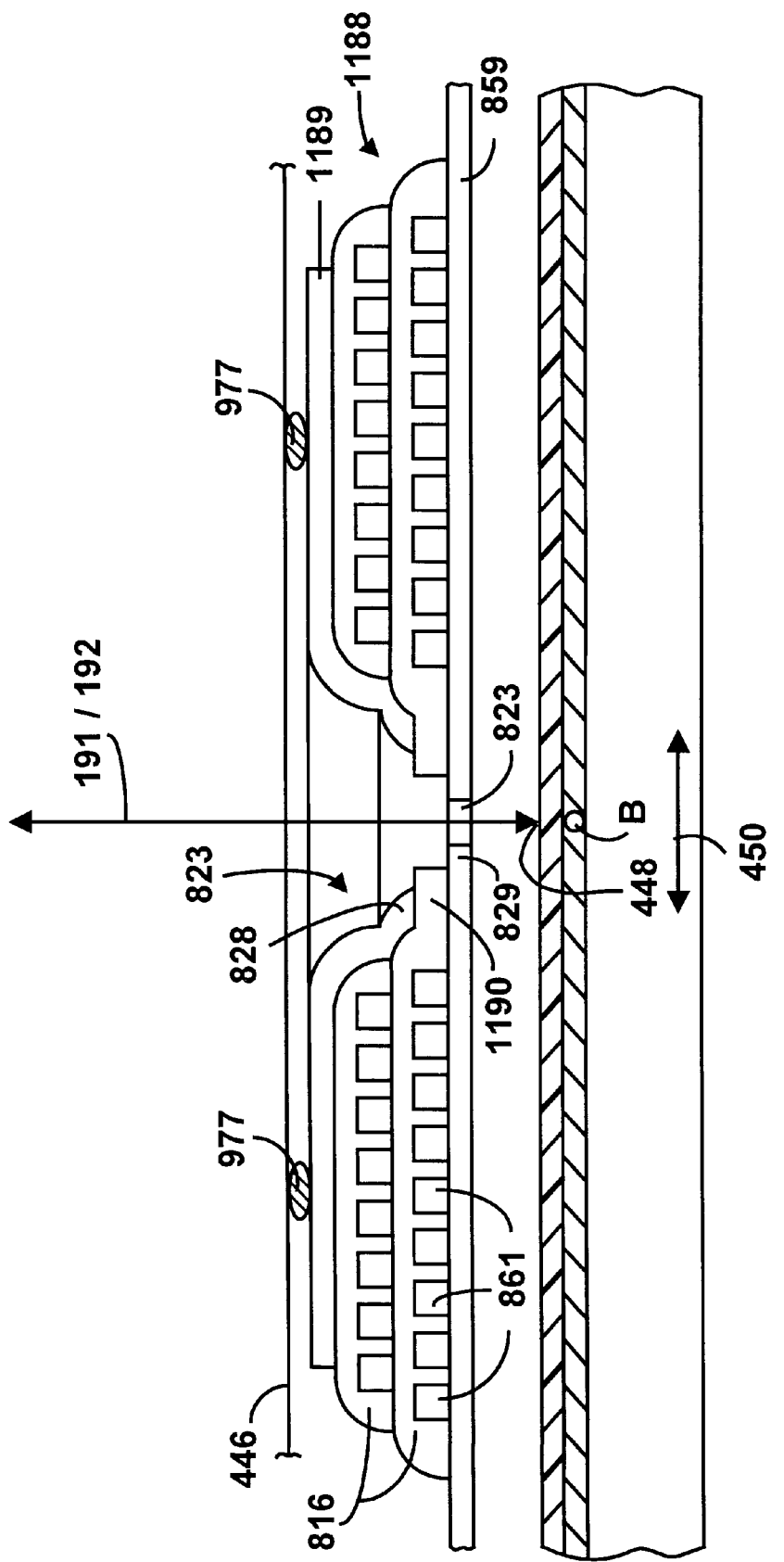
FIG. 11 is a view of another embodiment of an elongated magnetic coil.

FIG. 11 shows another elongated magnetic coil 1188 and yoke 1189, which are generally similar to the elongated magnetic coil 460 and yoke 462 of FIG. 9 with the exception of the yoke 1189 configuration. While the yoke tip 828 in FIG. 9 extends toward, and terminates unto, or in very close proximity to the protective layer 859, the yoke tip 828 of the elongated magnetic coil 1188 is shown to be recessed relative to the protective layer 859, and separated therefrom by the tip 1190 of the insulation layer 816.

Figure 13:
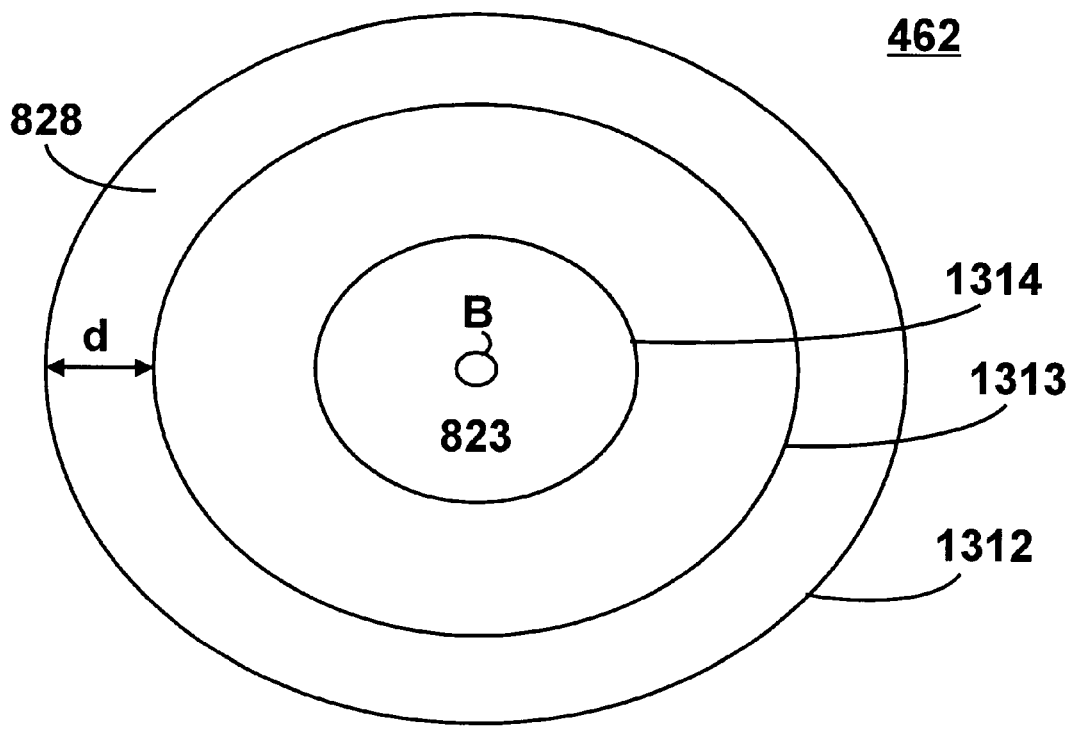
FIG. 13 is a bottom plan view of the yoke tip of an embodiment of a yoke.

FIG. 12 illustrates another elongated magnetic coil 1253 and yoke 1254 according to the present invention. The elongated magnetic coil 1253 and yoke 1254 are generally similar to the elongated magnetic coils 460 and 1188 and yokes 462 and 1189, with the exception that the footprint of the pole tip 1255 of the yoke 1254 is increased. Referring to FIG. 13, a bottom plan view of the footprint (or underside) of the yoke tip 828, as viewed from point B, is shown. The footprint of the yoke tip 828 is defined by two generally concentric edges: an outer edge 1312, and an inner edge 1313. The radial distance "d" between these two edges 1312 and 1313 determines the surface area of the footprint, and thus the magnetic flux density at point B. As further defined by Maxwell's equations, the vertical height or distance of the footprint of the yoke tip 828 relative to point B is a function of the footprint surface area, which, in turn, is a function of the radial distance "d". Although the edges 1312 and 1313 of yoke tip 828 are shown to be elongated, as discussed above, it should be clear that other shapes are within the scope of the invention.

Figure 14:
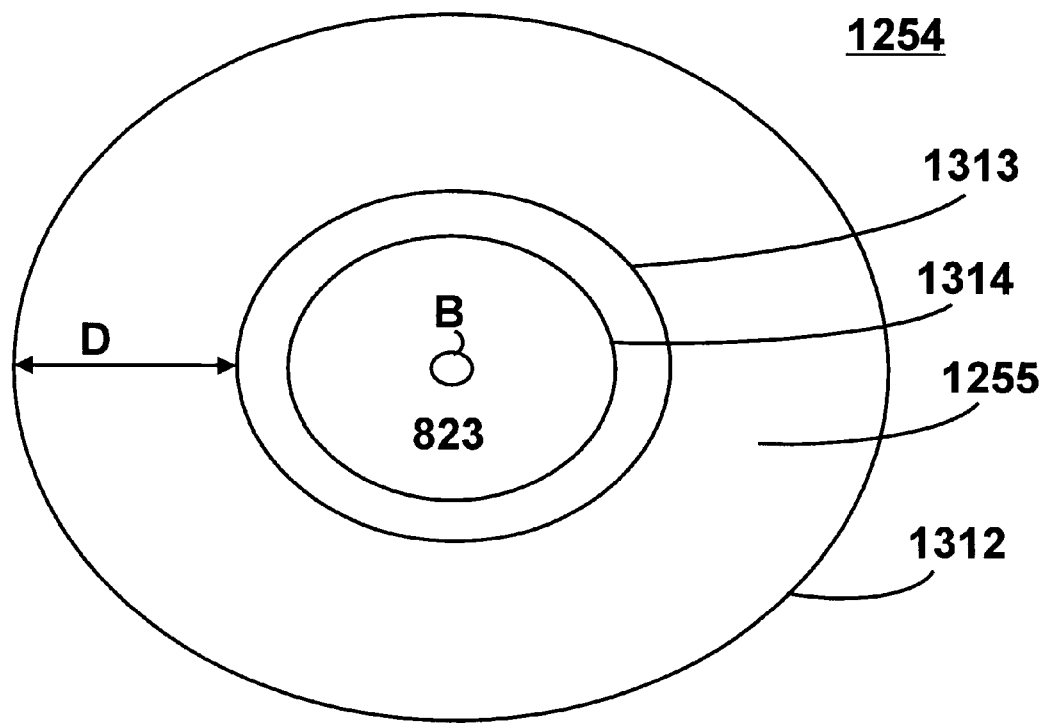
FIG. 14 is a bottom plan view of the yoke tip of another embodiment of a yoke.

Referring to FIG. 12 and to FIG. 14, the footprint of the yoke tip 1255 is defined by two generally concentric edges: an outer edge 1312, and an inner edge 1313. The outer edge 1312 of the yoke 1254 generally corresponds to the outer edges 1312 of the yokes 462 and 1189. However, the inner edge 1313 of the yoke 1254 is closer to the central passage 823 than the inner edge 1313 of the yokes 462 and 1189. As a result, the radial distance "D" between the outer and inner edges 1312 and 1313, respectively, is greater than distance "d", and causes the magnetic flux density at point B to be higher than the magnetic flux density using the yokes 462 or 1188. In yet another embodiment (not shown), the inner edge 1313 may substantially coincide with the edge 1314 of the central passage 823.

Figure 15A:
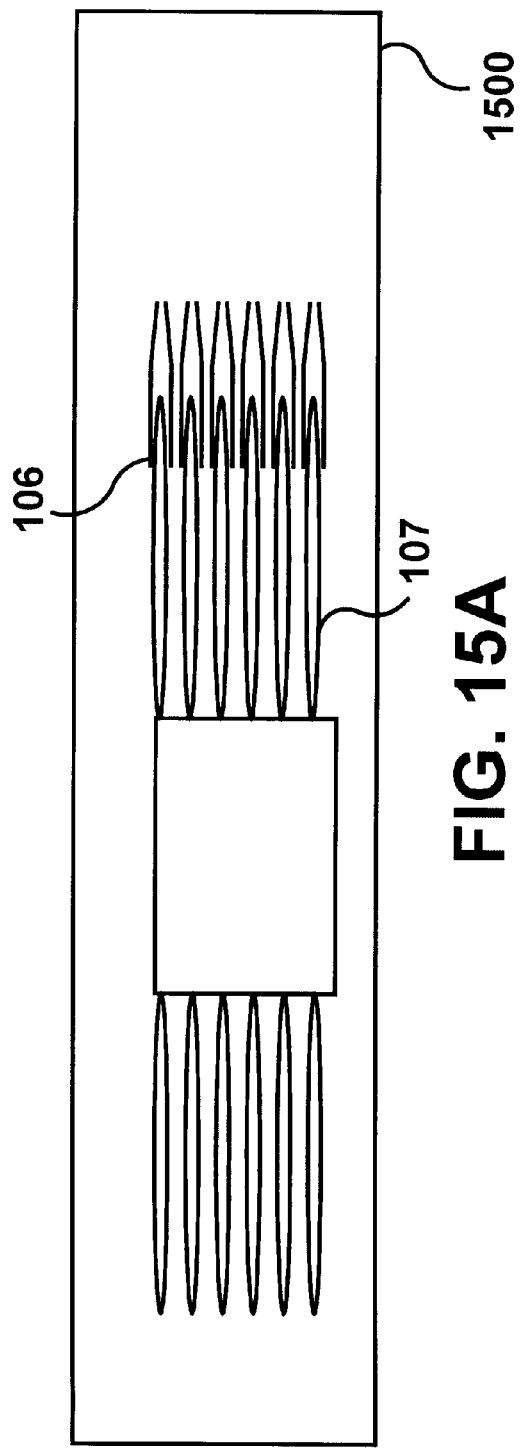
FIGS. 15A, & 15B is a diagram showing a magneto-optical data storage and retrieval system as part of a magneto-optical disk drive.
Figure 15B:
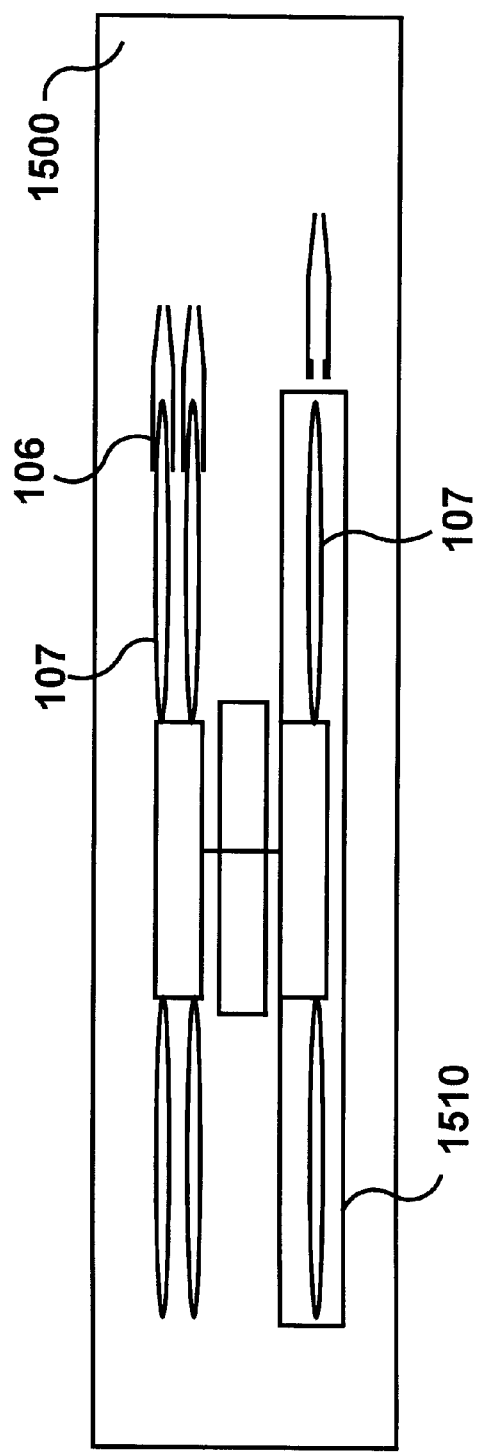

FIGS. 15A and 15B illustrate a magneto-optical data storage and retrieval system as part of a magneto-optical disk drive. In a preferred embodiment, the magneto-optical system 100 comprises a compact high-speed and high-capacity MO disk drive 1500 that includes an industry standard 5.25 inch half-height form factor (1.625 inch), at least six double-sided MO disks 107, and at least twelve flying MO heads 106. As discussed above, the flying MO heads 106 may be manufactured to include optical and magnetic elements that provide a very small mass and low profile high NA optical system so as to enable utilization of at least one double-sided MO disk 107 and preferably a plurality of double-sided MO disks 107 within a small form factor disk drive and; therefore, to comprise a higher areal and volumetric and storage capacity than is permitted in an equivalent volume of the prior art. In the preferred embodiment, a spacing between each of the at least six MO disks 107 is 0.182 inches. In an exemplary embodiment, the elongated magnetic coil 460 and yoke 462 enable each side of the MO disk 107 to comprise at least 5 GigaBytes of written data marks. The present invention should not, however, be limited by these specifications, as it is understood that in alternative embodiments other MO disk 107 data densities and other spacings between MO disks 107 are within the scope of the invention.

In an alternative embodiment, with a MO disk to MO disk spacing of 0.182 inches, the half-height form factor MO disk drive 1500 may include a removable MO disk cartridge portion 1510 and two fixed internal MO disks 107. By providing the removable MO disk cartridge portion 1510, the fixed internal and removable combination permits external information to be efficiently delivered to the MO disk drive 1500 for subsequent transfer to the internal MO disks 107. The copied information may, subsequently, be recorded back onto the removable MO disk cartridge portion 1510 for distribution to other computer systems. In addition, the removable MO disk cartridge portion 1510 allows for very convenient and high speed back-up storage of the internal MO spinning disks 107. The fixed internal and removable combination also permits storage of data files on the removable MO disk cartridge portion 1510 and system files and software applications on the internal MO spinning disks 107. In another alternative embodiment (not shown) an MO disk drive 1500 may include: any number (including zero) of internal MO disks 107 and/or any number of MO disks 107 within any number of removable MO disk cartridge portions 1510.

Although the present invention is described as being used in an MO disk drive 1500, use of magnetic coils as described with reference to FIGS. 1–14 may be practiced in many different optical disk drive embodiments, for example: without use of a yoke, with other form factors, with other optical sources of light, with other types of optical fibers, and with other optical elements. Free space optical paths may also be used to deliver and receive laser light, for example, with a suitably aligned laser diode and detector mounted on the actuator arm or, alternatively, on the flying head itself. Additionally, the present invention does not necessarily require use of rotary actuator arms, for example, linear actuator arms may be used.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

What is claimed is:

1. A coil for use in an optical or magneto-optical head, comprising:

a yoke formed of a tapered portion and an upper section;
    said tapered portion defining a central passage; and
    a thin-film conductor formed of a plurality of turns covered at least in part by, and disposed in proximity to said yoke upper section, and of at least one turn disposed in proximity to said yoke tapered section, wherein said yoke upper section provides a path for a magnetic field generated by said plurality of turns when an electric current is flown through said conductor.

2. A coil according to claim 1, wherein said conductor includes a multi-layered coil conductor, and further includes a plurality of turns disposed in proximity to said yoke tapered section.

3. A coil according to claim 2, wherein said conductor is a two-layered coiled conductor.

4. A coil according to claim 1, wherein said yoke upper section is generally flat.

5. A coil according to claim 4, wherein said yoke upper section is generally annularly shaped.

6. A coil according to claim 1, wherein the head includes an attachment surface; and wherein said yoke upper surface is secured to said attachment surface.

7. A coil according to claim 6, wherein the head includes an optical beam source that generates an optical beam; and wherein said optical beam passes through said central passage defined by said yoke tapered portion.

8. A coil according to claim 7, wherein said central passage is elongated for allowing said optical beam to be deflected relative to said central passage.

9. A coil according to claim 1, wherein the head includes a lens having an outer perimeter, and wherein the coil is smaller than said lens outer perimeter.

10. A coil according to claim 1, further including an insulation layer that covers at least a part of said conductor.

11. A coil according to claim 1, further including a protective layer on which said conductor is formed.

12. A coil according to claim 11, wherein said protective layer defines an opening which is disposed in substantial axial registration relative to said yoke central passage.

13. A coil according to claim 12, wherein said protective layer defines a tip portion that surrounds said protective layer opening;

wherein said yoke tapered portion defines a tip that surrounds said yoke central passage; and wherein said tapered portion tip contacts said protective layer tip portion.

14. A coil according to claim 12, wherein said protective layer defines a tip portion that surrounds said protective layer opening;

wherein said yoke tapered portion defines a tip that surrounds said yoke central passage; and wherein said tapered portion tip terminates in close proximity to said protective layer tip portion.

15. A coil according to claim 12, wherein said protective layer defines a tip portion that surrounds said protective layer opening;

wherein said yoke tapered portion defines a tip that surrounds said yoke central passage; and wherein said tapered portion tip is recessed relative to said protective layer tip portion.

16. A coil according to claim 15, further including an insulation layer that covers at least a part of said conductor and that defines a tip; and wherein said insulation layer tip is interposed between said tapered portion tip and said protective layer tip portion.

17. A coil according to claim 1, wherein said yoke tapered portion includes a tip defined by an outer edge and an inner edge;

wherein said outer edge and said inner edge are separated by a radial distance "d" that defines a footprint of said yoke tip.

18. A coil according to claim 17, wherein said outer edge and said inner edge are generally concentric.

19. A coil according to claim 17, further including an insulation layer that covers at least a part of said conductor;

wherein said insulation layer defines an opening which is disposed in substantial axial registration relative to said yoke central passage; and wherein said inner edge is disposed close proximity to said insulation layer opening.

20. A coil according to claim 1, wherein said conductor includes two pads.

21. A coil according to claim 1, wherein said conductors includes at least two layers; and wherein said layers are spaced apart in a vertical direction by approximately 6 microns.

22. A coil according to claim 1, wherein said yoke has a generally uniform thickness; and wherein said yoke thickness ranges between approximately 4 microns and approximately 6 microns.

23. A coil according to claim 1, wherein said conductor has a generally uniform thickness; and wherein said conductor thickness ranges between approximately 2 microns and 7 microns.

24. A coil according to claim 1, wherein said conductor is coiled and is generally elliptically shaped; and wherein said yoke is generally elliptically shaped.

25. A coil according to claim 1, wherein said conductor is coiled and is generally circularly shaped; and wherein said yoke is generally circularly shaped.

26. A coil according to claim 1, wherein said conductor includes between 15 and 40 turns.

27. A coil according to claim 1, wherein said conductor has a cross-sectional area ranging between approximately 2 microns$^2$ and 7 microns$^2$.

28. A method of using a coil in an optical or magneto-optical head having an attachment surface, comprising:

securing the coil to the attachment surface for allowing an optical beam to pass through the coil, wherein the coil includes:

a yoke formed of a tapered portion and an upper section; p2 said tapered portion defining a central passage; and a thin-film conductor formed of a plurality of turns covered at least in part by, and disposed in proximity to said yoke upper section, and of at least one turn disposed in proximity to said yoke tapered section, so that said yoke upper section provides a path for a magnetic field generated by said plurality of turns when an electric current is flown through said conductor.

29. A method according to claim 28, further including deflecting said optical beam relative to said central passage.

30. A coil for use in an optical or magneto-optical head, comprising:

a yoke formed of a central portion and an upper section;

said central portion defining a central passage; and a thin-film conductor formed of a plurality of turns covered at least in part by, and disposed in proximity to said yoke upper section, and of at least one turn disposed in proximity to said yoke central section, wherein said yoke upper section provides a path for a magnetic field generated by said plurality of turns when an electric current is flown through said conductor.

* * * * *